US012238435B2

(12) United States Patent
Hirose et al.

(10) Patent No.: US 12,238,435 B2
(45) Date of Patent: Feb. 25, 2025

(54) IMAGING DEVICE AND ELECTRONIC DEVICE

(71) Applicant: Semiconductor Energy Laboratory Co., Ltd., Atsugi (JP)

(72) Inventors: Takeya Hirose, Atsugi (JP); Seiichi Yoneda, Isehara (JP); Hiroki Inoue, Atsugi (JP); Takayuki Ikeda, Atsugi (JP); Shunpei Yamazaki, Setagaya (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/668,606

(22) Filed: May 20, 2024

(65) Prior Publication Data
US 2024/0305909 A1 Sep. 12, 2024

Related U.S. Application Data

(63) Continuation of application No. 17/911,193, filed as application No. PCT/IB2021/052110 on Mar. 15, 2021, now Pat. No. 12,041,366.

(30) Foreign Application Priority Data

Mar. 27, 2020 (JP) ................................. 2020-057810

(51) Int. Cl.
H04N 25/78 (2023.01)
H04N 25/705 (2023.01)
H04N 25/77 (2023.01)

(52) U.S. Cl.
CPC ........... *H04N 25/705* (2023.01); *H04N 25/77* (2023.01); *H04N 25/78* (2023.01)

(58) Field of Classification Search
CPC ...... H04N 25/705; H04N 25/77; H04N 25/78; H04N 25/70; H04N 25/75; H01L 27/14612; H01L 27/14636
See application file for complete search history.

(56) References Cited

U.S. PATENT DOCUMENTS 6,084,981 A * 7/2000 Horiba ................... G06V 10/30
706/20
7,151,844 B2 * 12/2006 Stevenson ............ G06V 20/588
382/104
(Continued)

FOREIGN PATENT DOCUMENTS

CN 110651468 A 1/2020
CN 110832845 A 2/2020
(Continued)

OTHER PUBLICATIONS

International Search Report (Application No. PCT/IB2021/052110) Dated Jun. 8, 2021.
(Continued)

*Primary Examiner* — Mekonnen D Dagnew
(74) *Attorney, Agent, or Firm* — Eric J. Robinson; Robinson Intellectual Property Law Office, P.C.

(57) ABSTRACT

An imaging device having a function of processing an image is provided. The imaging device has an additional function such as image processing, can hold analog data obtained by an image capturing operation in a pixel, and can extract data obtained by multiplying the analog data by a predetermined weight coefficient. Difference data between adjacent light-receiving devices can be obtained in a pixel, and data on luminance gradient can be obtained. When the data is taken in a neural network or the like, inference of distance data or the like can be performed. Since enormous volume of image data in the state of analog data can be held in pixels, processing can be performed efficiently.

2 Claims, 22 Drawing Sheets

(56) References Cited

U.S. PATENT DOCUMENTS

| | | |
|---|---|---|
| 8,378,391 B2 | 2/2013 | Koyama et al. |
| 8,916,869 B2 | 12/2014 | Koyama et al. |
| 9,331,112 B2 | 5/2016 | Koyama et al. |
| 9,762,834 B2* | 9/2017 | Govil .................... H04N 25/77 |
| 9,773,814 B2 | 9/2017 | Koyama et al. |
| 9,773,832 B2 | 9/2017 | Kurokawa |
| 10,074,687 B2 | 9/2018 | Kurokawa |
| 10,600,839 B2 | 3/2020 | Kurokawa |
| 10,951,850 B2 | 3/2021 | Yamamoto et al. |
| 10,964,743 B2 | 3/2021 | Kurokawa |
| 11,101,302 B2 | 8/2021 | Ikeda et al. |
| 2005/0018062 A1 | 1/2005 | Chiang et al. |
| 2011/0108836 A1 | 5/2011 | Koyama et al. |
| 2013/0119380 A1 | 5/2013 | Koyama et al. |
| 2015/0048366 A1 | 2/2015 | Koyama et al. |
| 2016/0172410 A1 | 6/2016 | Kurokawa |
| 2016/0233252 A1 | 8/2016 | Koyama et al. |
| 2016/0328642 A1* | 11/2016 | Himebaugh .......... G06F 1/3209 |
| 2017/0094220 A1* | 3/2017 | Kurokawa ........ H01L 27/14634 |
| 2018/0129893 A1* | 5/2018 | Son ........................ G06N 3/063 |
| 2020/0145600 A1 | 5/2020 | Yamamoto et al. |
| 2020/0176493 A1 | 6/2020 | Ikeda et al. |
| 2021/0233952 A1 | 7/2021 | Kurokawa |
| 2021/0384239 A1 | 12/2021 | Ikeda et al. |

FOREIGN PATENT DOCUMENTS

| | | |
|---|---|---|
| EP | 3654635 A | 5/2020 |
| JP | 2011-119711 A | 6/2011 |
| JP | 2016-123087 A | 7/2016 |
| KR | 2020-0012917 A | 2/2020 |
| KR | 2020-0028967 A | 3/2020 |
| WO | WO-2018/215882 | 11/2018 |
| WO | WO-2019/012369 | 1/2019 |

OTHER PUBLICATIONS

Written Opinion (Application No. PCT/IB2021/052110) Dated Jun. 8, 2021.

Kashiwagi.M et al., "Deep Depth from Aberration Map", 2019 IEEE/CVF International Conference on Computer Vision (ICCV), Oct. 27, 2019, pp. 4069-4078.

* cited by examiner $a = x_1 w_1 + x_2 w_2 + b$

FIG. 20A1
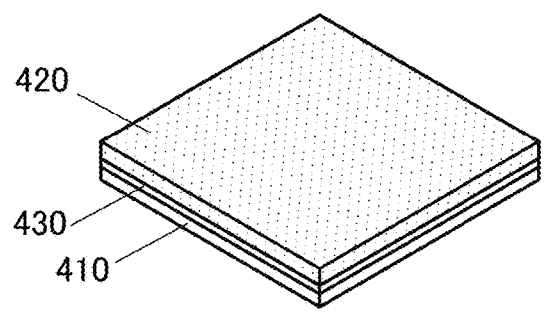
FIG. 20B1
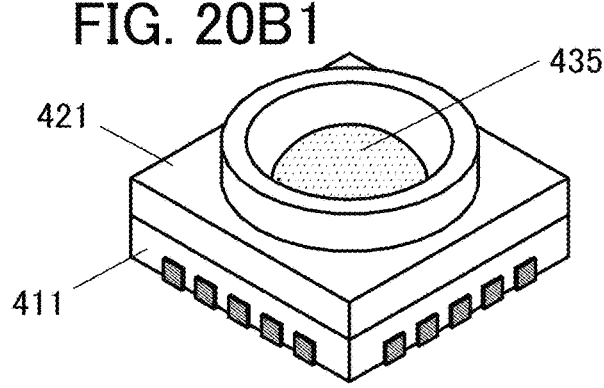
FIG. 20A2
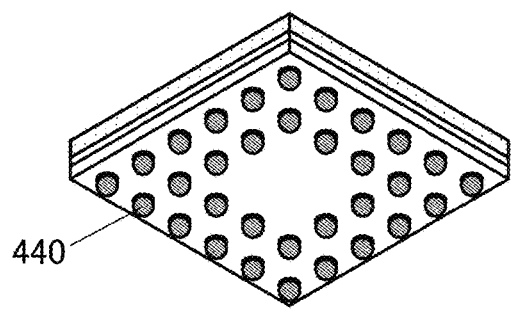
FIG. 20B2
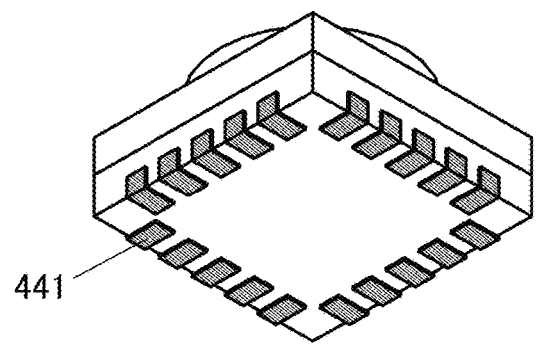
FIG. 20A3
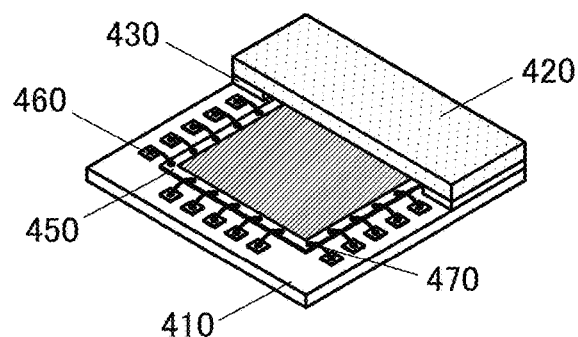
FIG. 20B3
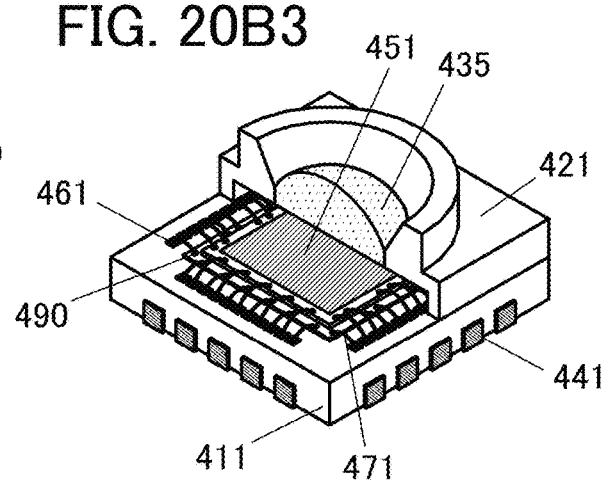

IMAGING DEVICE AND ELECTRONIC DEVICE

TECHNICAL FIELD

One embodiment of the present invention relates to an imaging device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Accordingly, more specific examples of the technical field of one embodiment of the present invention disclosed in this specification include a semiconductor device, a display device, a liquid crystal display device, a light-emitting device, a lighting device, a power storage device, a memory device, an imaging device, an operation method thereof, and a manufacturing method thereof.

In this specification and the like, a semiconductor device generally means a device that can function by utilizing semiconductor characteristics. A transistor and a semiconductor circuit are embodiments of semiconductor devices. In some cases, a memory device, a display device, an imaging device, or an electronic device includes a semiconductor device.

BACKGROUND ART

A technique for forming a transistor using an oxide semiconductor thin film formed over a substrate has attracted attention. For example, an imaging device with a structure in which a transistor including an oxide semiconductor and having an extremely low off-state current is used in a pixel circuit is disclosed in Patent Document 1.

A technique which adds an arithmetic function to an imaging device is disclosed in Patent Document 2.

REFERENCE

Patent Document

[Patent Document 1] Japanese Published Patent Application No. 2011-119711
[Patent Document 2] Japanese Published Patent Application No. 2016-123087

SUMMARY OF THE INVENTION

Problems to be Solved by the Invention

Imaging devices mounted on portable devices and the like generally have a function of obtaining images with high definition. Next-generation imaging devices are required to be equipped with more intelligent functions.

Image data (analog data) obtained by an imaging device is converted into digital data and taken out to the outside, and then image processing is performed as necessary. If the processing can be carried out in the imaging device, higher-speed communication with an external device is possible, improving user's convenience. Furthermore, load and power consumption of a peripheral device or the like can be reduced. Moreover, if complicated data processing is performed in an analog data state, time required for data conversion can be shortened.

For example, the luminance gradient is calculated from difference information of data between adjacent pixels, and distance data can be inferred by a DNN (a deep neural network) using the luminance gradient as data. Arithmetic operation on difference data between pixels and part of arithmetic operation by the DNN are performed in the imaging device, which enables high-speed inference with low power consumption.

In a portable information terminal such as a smartphone, data on the distance to an object can be obtained, and a taken image can be processed (e.g., blurring the back and forth of a target object). The distance data is obtained using parallaxes with a plurality of cameras. When the distance data can be obtained by image processing, the number of cameras can be one, whereby the manufacturing cost can be reduced.

Therefore, an object of one embodiment of the present invention is to provide an imaging device capable of image processing. Another object is to provide an imaging device capable of obtaining distance data. Another object is to provide an imaging device capable of obtaining data on luminance gradient between adjacent pixels. Another object is to provide an imaging device functioning as a component of part of a neural network. Another object is to provide an imaging device with low power consumption. Another object is to provide a highly reliable imaging device. Another object is to provide a novel imaging device or the like. Another object is to provide a method for driving the above-described imaging device. Another object is to provide a novel semiconductor device or the like.

Note that the description of these objects does not preclude the existence of other objects. One embodiment of the present invention does not have to achieve all these objects. Other objects are apparent from and can be derived from the description of the specification, the drawings, the claims, and the like.

Means for Solving the Problems

One embodiment of the present invention relates to an imaging device having an image processing function.

One embodiment of the present invention is an imaging device including a pixel and a reading circuit. The pixel includes a first light-receiving circuit, a second light-receiving circuit, an amplifier circuit, and an arithmetic circuit. The amplifier circuit is capable of outputting a potential based on a difference between first data held in the first light-receiving circuit and second data held in the second light-receiving circuit to the arithmetic circuit. The arithmetic circuit includes a first node and a second node. A first potential output by the amplifier circuit when the first data and the second data have the same value is written to the first node. A second potential output by the amplifier circuit when the first data and the second data are generated by photoelectric conversion is written to the second node. A third potential can be added to each of the first node and the second node. The reading circuit can extract a product of the second potential and the third potential by arithmetic operation using a current flowing in accordance with a potential of the first node and a current flowing in accordance with a potential of the second node.

The reading circuit includes a current mirror circuit and a correlated double sampling circuit. The current mirror circuit includes a first transistor and a second transistor. A gate and one of a source and a drain of the first transistor is electrically connected to the first node. One of a source and a drain of the second transistor can be electrically connected to the second node and the correlated double sampling circuit.

Another embodiment of the present invention is an imaging device including a pixel and a reading circuit. The pixel includes a first light-receiving circuit, a second light-receiving circuit, an amplifier circuit, and an arithmetic circuit. The amplifier circuit includes a first input terminal and a second input terminal. The arithmetic circuit includes a first node, a second node, a first capacitor, a second capacitor, a first transistor, and a second transistor. One electrode of the first capacitor and a gate of the first transistor are electrically connected to the first node. One electrode of the second capacitor and a gate of the second transistor are electrically connected to the second node. The reading circuit is electrically connected to one of a source and a drain of the first transistor and one of a source and a drain of the second transistor. The first light-receiving circuit is electrically connected to the first input terminal. The second light-receiving circuit is electrically connected to the second input terminal. A first potential output by the amplifier circuit when the same potential is input to the first input terminal and the second input terminal is written to the first node. A second potential output by the amplifier circuit in accordance with a difference between data generated by the first light-receiving circuit and data generated by the second light-receiving circuit is written to the second node. A third potential can be added to each of the first node and the second node through the first capacitor or the second capacitor. The reading circuit can extract the product of the second potential and the third potential by arithmetic operation using a current flowing through the first transistor and a current flowing through the second transistor.

The reading circuit includes a current mirror circuit and a correlated double sampling circuit. The current mirror circuit includes a third transistor and a fourth transistor. A gate and one of a source and a drain of the third transistor are electrically connected to the one of the source and the drain of the first transistor. One of a source and a drain of the fourth transistor can be electrically connected to the one of the source and the drain of the second transistor and the correlated double sampling circuit.

Each of the first light-receiving circuit and the second light-receiving circuit includes a photoelectric conversion device, a fifth transistor, a sixth transistor, and a third capacitor. One electrode of the photoelectric conversion device is electrically connected to one of a source and a drain of the fifth transistor, and the other of the source and the drain of the fifth transistor is electrically connected to one of a source and a drain of the sixth transistor and one electrode of the third capacitor. The other of the source and the drain of the sixth transistor included in the first light-receiving circuit is electrically connected to the first input terminal. The other of the source and the drain of the sixth transistor included in the second light-receiving circuit can be electrically connected to the second input terminal.

It is preferable that the fifth transistor and the sixth transistor each include a metal oxide in a channel formation region, and the metal oxide include In, Zn, and M (M is one or more of Al, Ti, Ga, Ge, Sn, Y, Zr, La, Ce, Nd, and Hf).

It is preferable that each of the first light-receiving circuit and the second light-receiving circuit further include a seventh transistor and an eighth transistor, a gate of the seventh transistor be electrically connected to the one electrode of the third capacitor, and one of a source and a drain of the seventh transistor be electrically connected to one of a source and a drain of the eighth transistor.

The amplifier circuit includes a ninth transistor, a tenth transistor, and an eleventh transistor. One of a source and a drain of the ninth transistor is electrically connected to the one electrode of the third capacitor included in the first light-receiving circuit. The other of the source and the drain of the ninth transistor is electrically connected to the first input terminal. One of a source and a drain of the tenth transistor is electrically connected to the one electrode of the third capacitor included in the second light-receiving circuit. The other of the source and the drain of the tenth transistor is electrically connected to the second input terminal. One of a source and a drain of the eleventh transistor is electrically connected to the first input terminal. The other of the source and the drain of the eleventh transistor can be electrically connected to the second input terminal.

It is preferable that the ninth transistor to the eleventh transistor each include a metal oxide in a channel formation region, and the metal oxide include In, Zn, and M (M is one or more of Al, Ti, Ga, Ge, Sn, Y, Zr, La, Ce, Nd, and Hf).

In the above, a plurality of pixels can be electrically connected to one reading circuit.

Another embodiment of the present invention is an electronic device that processes part of an image taken with the imaging device on the basis of the image and distance data of an object in the image analyzed with the imaging device.

Effect of the Invention

With one embodiment of the present invention, an imaging device capable of image processing can be provided. An imaging device capable of obtaining distance data can be provided. An imaging device capable of obtaining data on luminance gradient between adjacent pixels can be provided. An imaging device functioning as a component of part of a neural network can be provided. An imaging device with low power consumption can be provided. A highly reliable imaging device can be provided. A novel imaging device or the like can be provided. A method for driving the above-described imaging device can be provided. A novel semiconductor device or the like can be provided.

BRIEF DESCRIPTION OF THE DRAWINGS

FIG. 20A1 to FIG. 20A3 and FIG. 20B1 to FIG. 20B3 are perspective views of a package and a module in which an imaging device is placed.

MODE FOR CARRYING OUT THE INVENTION

Figure 1:
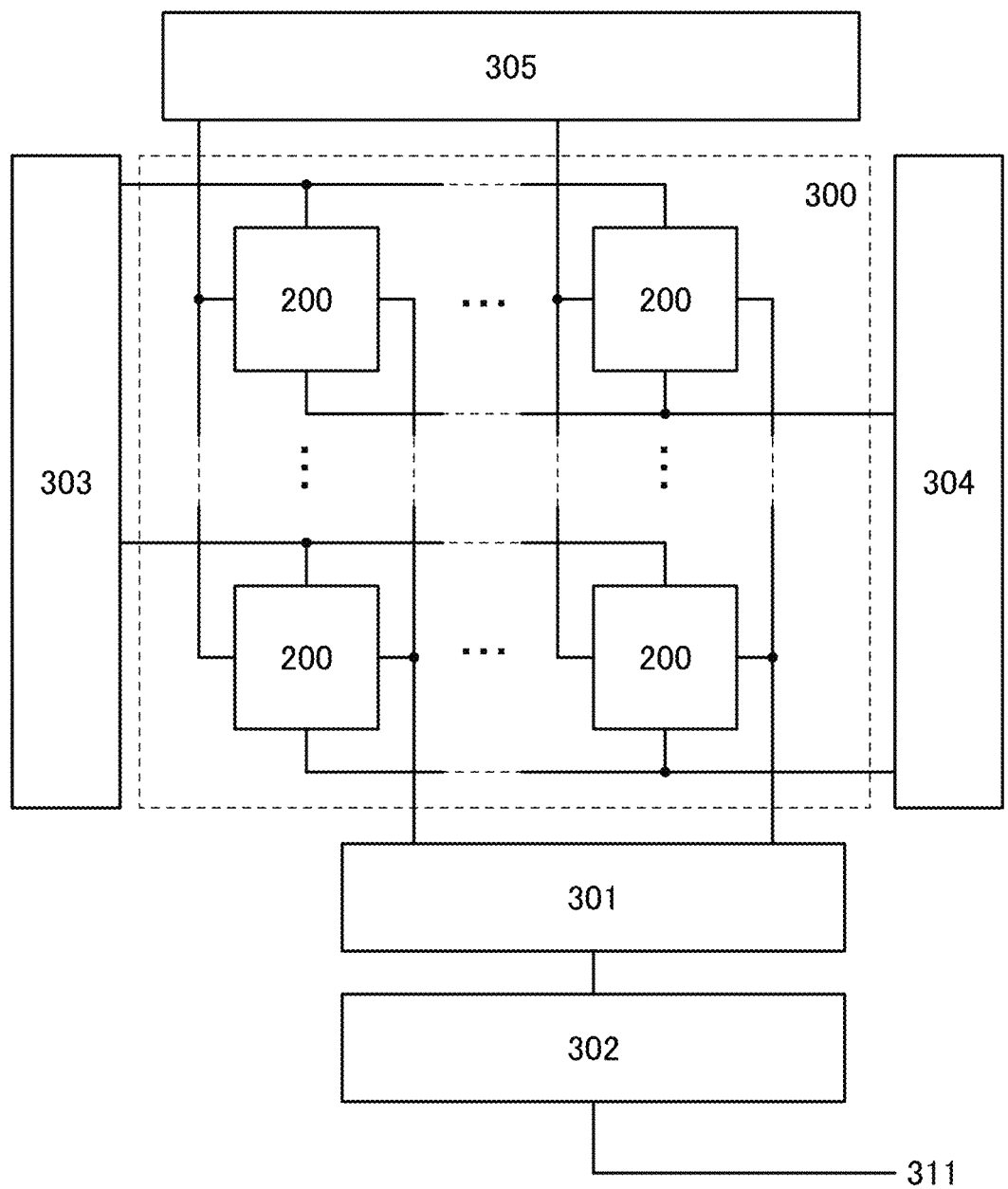
FIG. 1 is a block diagram illustrating an imaging device.

Embodiments are described in detail with reference to the drawings. However, the present invention is not limited to the following description, and it is readily appreciated by those skilled in the art that modes and details can be modified in various ways without departing from the spirit and the scope of the present invention. Therefore, the present invention should not be interpreted as being limited to the description of the embodiments below. Note that in structures of the invention described below, the same portions or portions having similar functions are denoted by the same reference numerals in different drawings, and the description thereof is not repeated in some cases. The same components are denoted by different hatching patterns in different drawings, or the hatching patterns are omitted in some cases.

Even in the case where a single component is illustrated in a circuit diagram, the component may be composed of a plurality of parts as long as there is no functional inconvenience. For example, in some cases, a plurality of transistors that operate as a switch are connected in series or in parallel. In some cases, capacitors are divided and arranged in a plurality of positions.

One conductor has a plurality of functions such as a wiring, an electrode, and a terminal in some cases. In this specification, a plurality of names are used for the same component in some cases. Even in the case where elements are illustrated in a circuit diagram as if they were directly connected to each other, the elements may actually be connected to each other through one conductor or a plurality of conductors. In this specification, even such a structure is included in direct connection.

Embodiment 1

In this embodiment, an imaging device of one embodiment of the present invention is described with reference to drawings.

One embodiment of the present invention is an imaging device having an additional function such as image processing. The imaging device can hold analog data (image data) obtained by an image capturing operation in a pixel and extract data obtained by multiplying the analog data by a predetermined weight coefficient.

Furthermore, difference data between adjacent light-receiving devices can be obtained in a pixel, and data on luminance gradient can be obtained. When the data is taken in a neural network or the like, inference of distance data or the like can be performed. Since enormous volume of image data in the state of analog data can be held in pixels, processing can be performed efficiently.

Obtaining distance data in an image can support picking operation by a robot, autonomous driving of a moving object, distance measurement, or the like. In addition, it becomes possible for a smartphone or the like to obtain distance data with one camera, although a plurality of cameras have been used to obtain distance data, so that the manufacturing cost can be reduced.

<Imaging Device>

FIG. 1 is a block diagram illustrating the imaging device of one embodiment of the present invention. The imaging device includes a pixel array 300, a circuit 301, a circuit 302, a circuit 303, a circuit 304, and a circuit 305. Note that each of the structures of the circuit 301 to the circuit 305 is not limited to a single circuit and may consist of a combination of a plurality of circuits. Furthermore, any two or more of the circuits described above may be combined. Moreover, a circuit other than the above circuits may be connected.

The pixel array 300 has an image capturing function and an arithmetic function. The circuit 301 has an arithmetic function. The circuit 302 has an arithmetic function or a data conversion function. The circuits 303 and 304 each have a selection function. The circuit 305 has a function of supplying a potential for product-sum operation to a pixel. As a circuit having a selection function, a shift register, a decoder, or the like can be used. Note that the circuits 301 and 302 may be provided outside.

Figure 2:
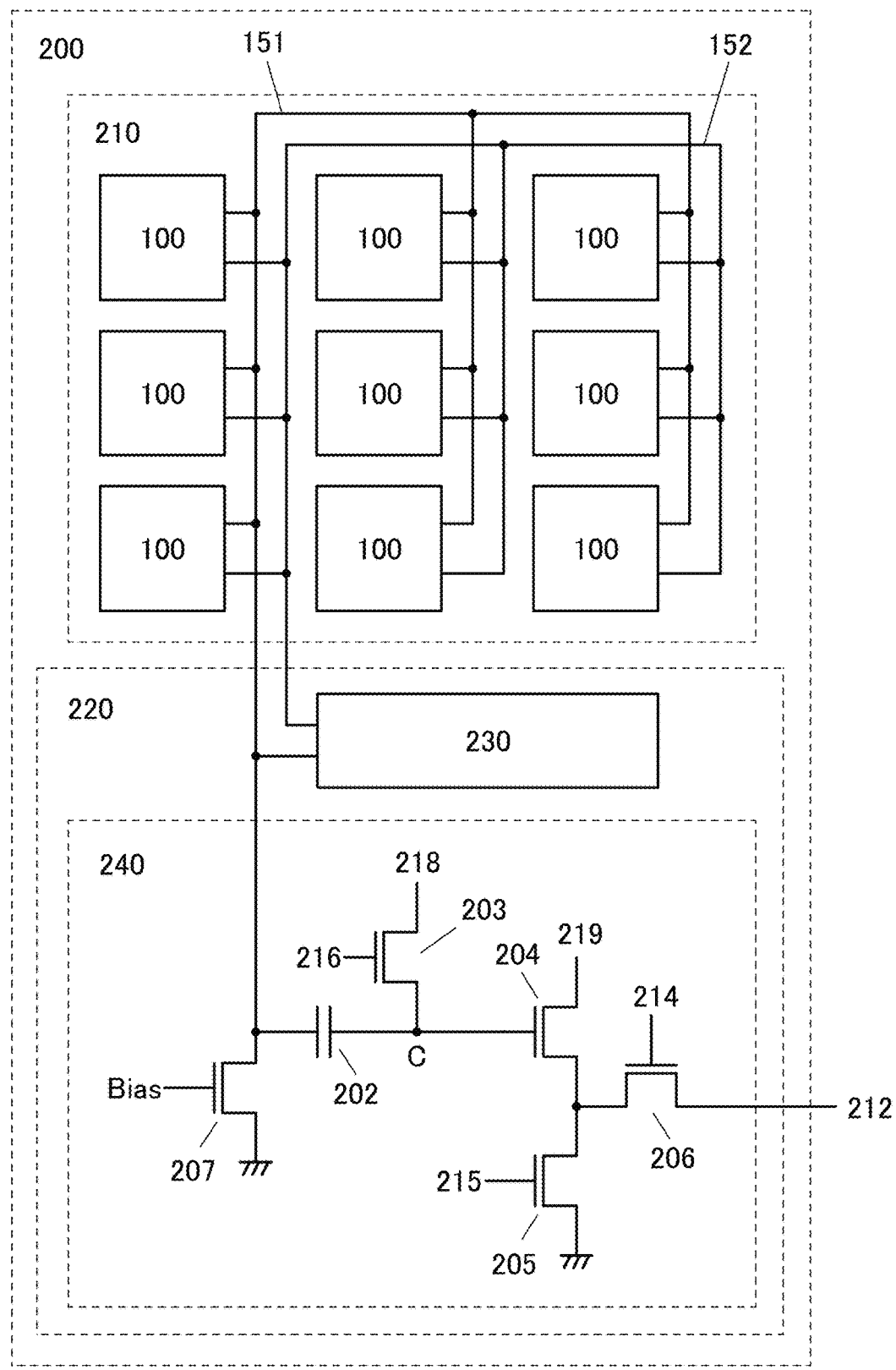
FIG. 2 is a diagram illustrating a pixel block 200 and a circuit 240.

The pixel array 300 includes a plurality of pixel blocks 200. The pixel block 200 includes a pixel array 210 and a circuit 220 as illustrated in FIG. 2.

The pixel array 210 includes the plurality of pixels 100 arranged in a matrix, each of the pixels 100 is electrically connected to a wiring 151 and a wiring 152, and the wiring 151 and the wiring 152 are electrically connected to the circuit 220.

The circuit 220 is a reading circuit and includes a circuit 230 and a circuit 240. The circuit 230 is a current source circuit and has a function of controlling current flowing through the pixel array 210 and the circuit 240. The circuit 240 is a difference extraction circuit, and for example, a correlated double sampling circuit (CDS circuit) can be used.

The circuit 230, the circuit 240, and the pixel array 210 are preferably formed such that two or more of the circuits have an overlapped region. This structure can reduce the area of the pixel block 200, leading to higher resolution. Note that the circuit 240 can also be provided outside the pixel block 200.

Note that the number of pixels included in the pixel array 210 is 3×3 in an example illustrated in FIG. 2 but is not limited to this. For example, the number of pixels can be 2×2, 4×4, or the like. Alternatively, the number of pixels in a horizontal direction and the number of pixels in a vertical direction may differ from each other. Alternatively, the number of pixels may be variable by providing a switch or the like between the pixel 100 and each of the wiring 151 and the wiring 152. Furthermore, some pixels may be shared by adjacent pixel blocks 200. An amplifier circuit or a gain control circuit may be electrically connected to the wiring 151.

The pixel 100 can perform acquisition of image data, generation of arithmetic data using the image data, generation of data that is obtained by adding the arithmetic data and weight coefficient, or the like. The pixel block 200 with the above structure can operate as a product-sum operation circuit.

<Pixel Circuit>

Figure 3:
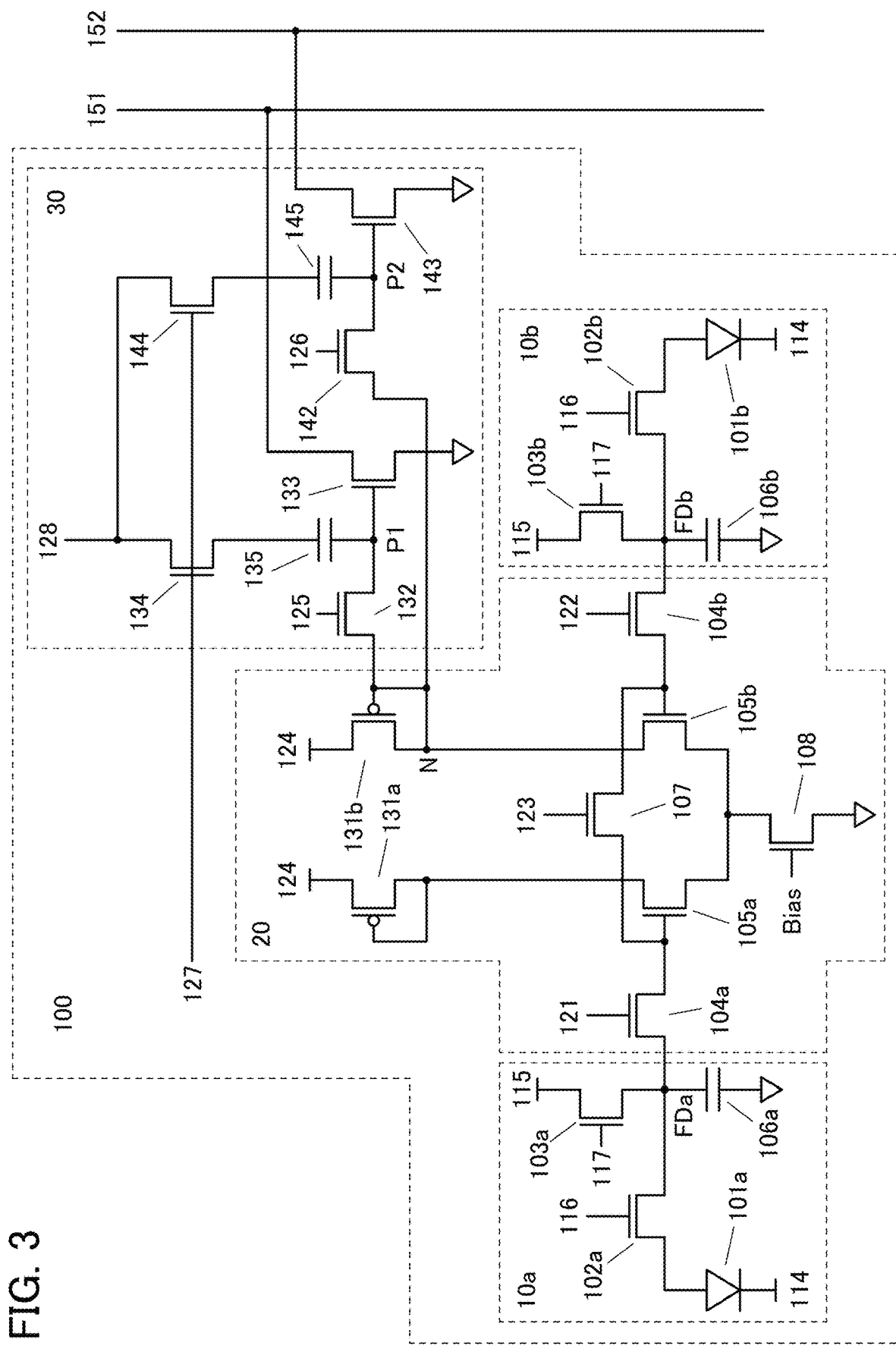
FIG. 3 is a diagram illustrating a pixel 100.

FIG. 3 illustrates a structure example of the pixel 100. The pixel 100 includes circuits 10a and 10b, a circuit 20, and a circuit 30.

The circuits 10a and 10b are light-receiving circuits and have a function of generating imaging data using a photoelectric conversion device. The circuit 20 is a differential amplifier circuit and has a function of outputting a data potential amplified in accordance with a difference between data input from the circuit 10a and the circuit 10b. The circuit 30 is an arithmetic circuit and has a function of holding a data potential output from the circuit 20 and a function of adding a weight (a potential corresponding to a weight coefficient) to the data potential.

<Light-Receiving Circuit>

The circuits 10a and 10b can have the same structure and include a photoelectric conversion device 101 (a photoelectric conversion device 101a or 101b), a transistor 102 (a transistor 102a or 102b), a transistor 103 (a transistor 103a or 103b), and a capacitor 106 (a capacitor 106a or 106b).

One electrode of the photoelectric conversion device 101 is electrically connected to one of a source and a drain of the transistor 102. The other of the source and the drain of the transistor 102 is electrically connected to one of a source and a drain of the transistor 103 and one electrode of the capacitor 106.

The other electrode of the photoelectric conversion device 101 is electrically connected to a wiring 114. The other of the source and the drain of the transistor 103 is electrically connected to a wiring 115. A gate of the transistor 102 is electrically connected to a wiring 116. A gate of the transistor 103 is electrically connected to a wiring 117.

Here, a point where the other of the source and the drain of the transistor 102, the one of the source and the drain of the transistor 103, and the one electrode of the capacitor 106 are electrically connected is referred to as a node FD (a node FDa or a node FDb).

The wirings 114 and 115 can each have a function of a power supply line. For example, the wiring 114 can function as a high potential power supply line, and the wiring 115 can function as a low potential power supply line. The wirings 116 and 117 can function as signal lines for controlling the electrical conduction of the respective transistors.

As the photoelectric conversion device 101, a photodiode can be used. There is no limitation on the kind of photodiode, and a Si photodiode containing silicon in a photoelectric conversion layer, an organic photodiode including an organic photoconductive film in a photoelectric conversion layer, or the like can be used. In order to increase the light detection sensitivity under low illuminance conditions, an avalanche photodiode is preferably used.

The transistor 102 can have a function of controlling the potential of the node FD. The transistor 103 can have a function of initializing the potential of the node FD.

In the case where an avalanche photodiode is used as the photoelectric conversion device 101, a high voltage is sometimes applied and thus a transistor with a high withstand voltage is preferably used as a transistor connected to the photoelectric conversion device 101. As the transistor with a high withstand voltage, a transistor using a metal oxide in its channel formation region (hereinafter, an OS transistor) or the like can be used, for example. Specifically, an OS transistor is preferably used as the transistor 102.

The OS transistor also has a feature of an extremely low off-state current. When OS transistors are used as the transistors 102 and 103, the charge retention period of the node FD can be lengthened greatly. Therefore, a global shutter mode in which charge accumulation operation is performed in all the pixels at the same time can be used without complicating the circuit structure and operation method. Furthermore, while image data is held in the node FD, arithmetic operation using the image data can be performed a plurality of times.

On the other hand, in the case where high-speed operation is desired, a transistor using silicon in a channel formation region (hereinafter referred to as a Si transistor) and having high mobility is preferably used. Accordingly, Si transistors may be used as the transistors 102 and 103.

Note that without limitation to the above, an OS transistor and a Si transistor may be used in combination freely. Examples of the Si transistor include a transistor including amorphous silicon and a transistor including crystalline silicon (microcrystalline silicon, low-temperature polysilicon, or single crystal silicon).

Note that the circuit structures of the circuits 10a and 10b described above are examples, and the photoelectric conversion operation can also be performed with other circuit structures.

Figure 4A:
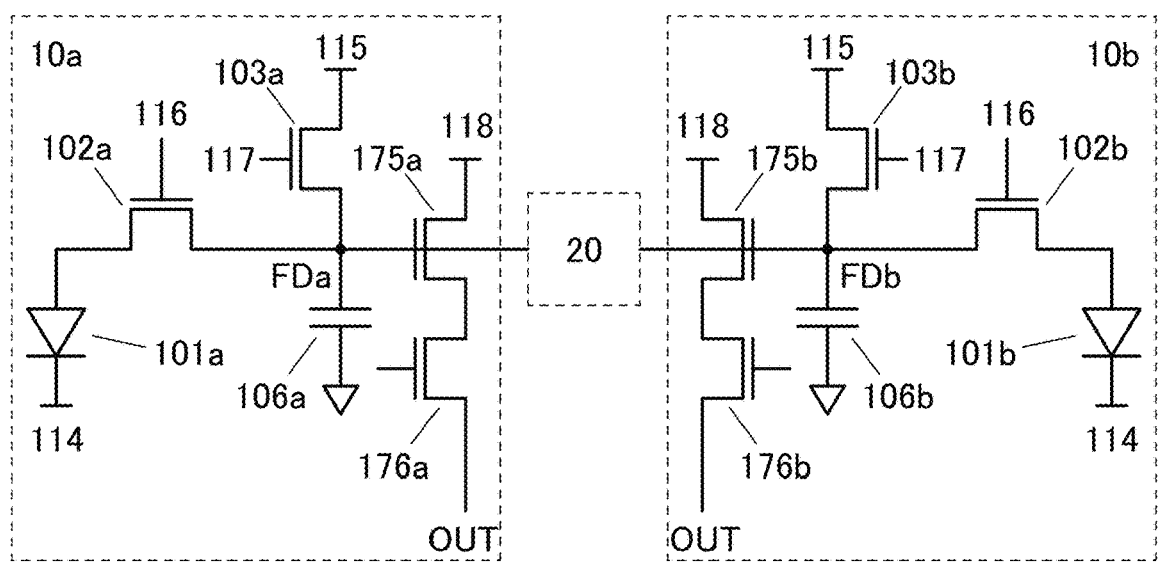
FIG. 4A is a diagram illustrating a light-receiving circuit.

The circuits 10a and 10b may include a transistor 175 (a transistor 175a or 175b) and a transistor 176 (a transistor 176a or 176b) as illustrated in FIG. 4A.

A gate of the transistor 175 is electrically connected to the node FD. One of a source and a drain of the transistor 175 is electrically connected to a wiring 118. The other of the source and the drain of the transistor 175 is electrically connected to one of a source and a drain of the transistor 176. The other of the source and the drain of the transistor 176 is electrically connected to a wiring OUT. The wiring 118 may function as a power supply line and may be connected to the wiring 115.

The transistor 175 is a component of a source follower that outputs data in accordance with the potential of the node FD. The transistor 176 functions as a selection transistor for selecting a light-receiving circuit to be read. Thus, with the use of the circuits 10a and 10b with the structure in FIG. 4A, image data can be read from the light-receiving circuits to the wiring OUT. With this structure, reading of image data can be performed in parallel with the operation of the circuit 20.

<Differential Amplifier Circuit>

The circuit 20 can include transistors 104 (transistors 104a and 104b), transistors 105 (transistors 105a and 105b), a transistor 107, a transistor 108, and transistors 131 (transistors 131a and 131b).

One of a source and a drain of the transistor 104a is electrically connected to a gate of the transistor 105a and one of a source and a drain of the transistor 107. One of a source and a drain of the transistor 104b is electrically connected to a gate of the transistor 105b and the other of the source and the drain of the transistor 107. One of a source and a drain of the transistor 105a is electrically connected to one of a source and a drain of the transistor 131a. One of a source and a drain of the transistor 105b is electrically connected to one of a source and a drain of the transistor 131b and a gate thereof. The other of the source and the drain of the transistor 105a is electrically connected to the other of the source and the drain of the transistor 105b and one of a source and a drain of the transistor 108.

The other of a source and a drain of the transistor 131 is electrically connected to a wiring 124. The other of the source and the drain of the transistor 108 is electrically connected to a reference potential line such as a GND wiring or the low potential power supply line. A gate of the transistor 104a is electrically connected to a wiring 121. A gate of the transistor 104b is electrically connected to a wiring 122. A gate of the transistor 107 is electrically connected to a wiring 123.

The wiring 124 can have a function of, for example, a power supply line that supplies a high potential power. The wiring 121, the wiring 122, and the wiring 123 can have a function of signal lines that control the conduction of the transistors.

The transistor 104 functions as a switch. The other of the source and the drain of the transistor 104a is electrically connected to the node FDa of the circuit 10a. The other of the source and the drain of the transistor 104b is electrically connected to the node FDb of the circuit 10b. Thus, the transistors 104 can be regarded as components of the circuits 10a and 10b.

The transistors 105 function as a pair of differential transistors in a differential amplifier circuit. The gate of the transistor 105a functions as a first input terminal of the circuit 20. The gate of the transistor 105b functions as a second input terminal of the circuit 20. Thus, data generated by the circuit 10a can be input to the first input terminal. Data generated by the circuit 10b can be input to the second input terminal.

The transistor 107 functions as a switch, and can make the first input terminal and the second input terminal have the same potential. The switch can be used when reference data is obtained.

The transistor 108 functions as a current source, and an appropriate potential (Bias) is supplied to a gate thereof. Note that a resistor may be used instead of the transistor 108.

The transistor 131 functions as a voltage converter circuit. Note that the transistor 131 is illustrated as a diode-connected p-channel transistor in FIG. 3 as an example, but may be a diode-connected n-channel transistor. Alternatively, a diode element, a resistor, or a cascode circuit may be used instead of the transistor 131.

Part of a wiring that connects the one of the source and the drain of the transistor 105b to the one of the source and the drain of the transistor 131b also functions as an output terminal, and is represented by a node N in FIG. 3. A data potential amplified in accordance with a difference between output data of the circuit 10a and output data of the circuit 10b can be output to the output terminal (the node N).

Figure 4B:
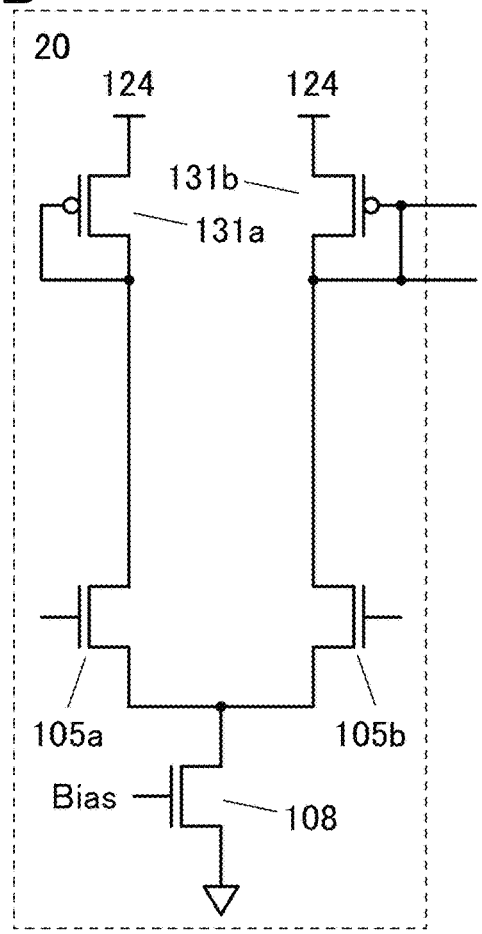
FIG. 4B is a diagram illustrating a differential amplifier circuit.

Note that the circuit 20 may have a structure in which the transistor 104 and the transistor 107 are omitted as illustrated in FIG. 4B. Although the transistor 104 and the transistor 107 are provided to make the first input terminal and the second input terminal have the same potential, when a potential (a reset potential) of the wiring 115 supplied through the transistor 103 is used as the potential, the transistor 104 and the transistor 107 can be omitted.

<Arithmetic Circuit>

The circuit 30 can have a structure including a transistor 132, a transistor 133, a transistor 134, a transistor 142, a transistor 143, a transistor 144, a capacitor 135, and a capacitor 145.

One of a source and a drain of the transistor 132 is electrically connected to one electrode of the capacitor 135 and a gate of the transistor 133. The other electrode of the capacitor 135 is electrically connected to one of a source and a drain of the transistor 134. One of a source and a drain of the transistor 142 is electrically connected to one electrode of the capacitor 145 and a gate of the transistor 143. The other electrode of the capacitor 145 is electrically connected to one of a source and a drain of the transistor 144.

A gate of the transistor 132 is electrically connected to a wiring 125. A gate of the transistor 142 is electrically connected to a wiring 126. A gate of the transistor 134 and a gate of the transistor 144 are electrically connected to a wiring 127. The other of the source and the drain of the transistor 132 and the other of the source and the drain of the transistor 142 are each electrically connected to the node N. The other of the source and the drain of the transistor 134 and the other of the source and the drain of the transistor 144 are each electrically connected to a wiring 128.

One of a source and a drain of the transistor 133 is electrically connected to the wiring 151. One of a source and a drain of the transistor 143 is electrically connected to the wiring 152. The other of the source and the drain of the transistor 133 and the other of the source and the drain of the transistor 143 are electrically connected to the reference potential line such as a GND wiring or the low potential power supply line.

The wiring 125, the wiring 126, and the wiring 127 can have a function of signal lines that control the conduction of the transistors. The wiring 128 is, for example, a wiring capable of supplying a potential corresponding to a weight coefficient (e.g., a filter for convolution processing), and is electrically connected to the circuit 305 (see FIG. 1). The wiring 151 is a wiring electrically connected to the circuit 230 and the circuit 240, and the wiring 152 is a wiring electrically connected to the circuit 230 (see FIG. 2).

Here, a point (wiring) at which one of a source and a drain of the transistor 132, one electrode of the capacitor 135, and the gate of the transistor 133 are connected is referred to as a node P1. A point (wiring) at which the one of the source and the drain of the transistor 142, the one electrode of the capacitor 145, and the gate of the transistor 143 are connected is referred to as a node P2.

Data output by the circuit 20 can be stored in the node P1 and the node P2. The node P1 and the node P2 can be floating. Thus, a potential (weight coefficient) supplied by the wiring 128 can be supplied to data held in the node P1 and the node P2 by capacitive coupling of the capacitor 135 or the capacitor 145.

<Reading Circuit>

Next, a structure of the reading circuit 220 will be described. The reading circuit 220 includes a circuit 230 functioning as a current source circuit and a circuit 240 functioning as a difference extraction circuit.

<Current Source Circuit>

Figure 5A:
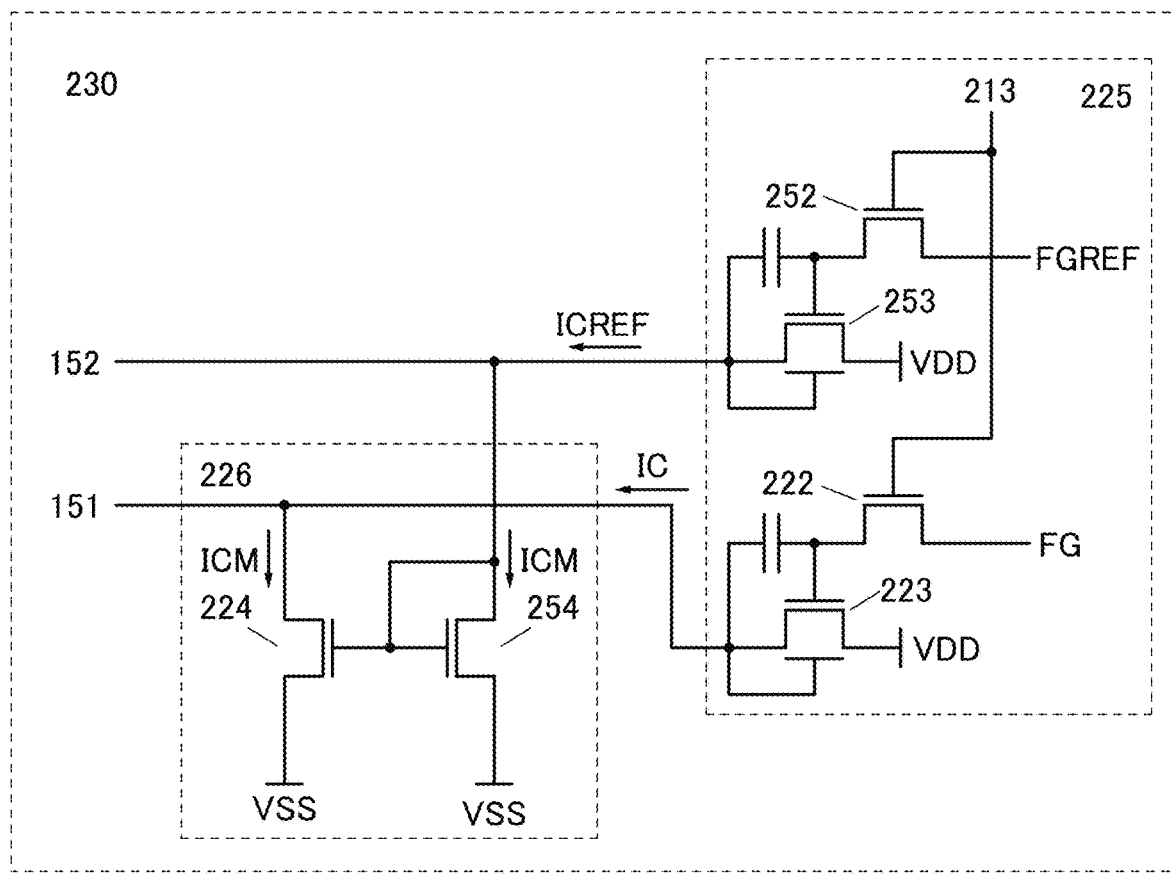
FIG. 5A and FIG. 5B are diagrams illustrating a current source circuit.

The circuit 230 can make a current flow in accordance with data held in the pixel 100, and can have the structure illustrated in FIG. 5A, for example. The circuit 230 can include a current supply portion 225 and a current mirror portion 226.

FIG. 5A illustrates a structure including an n-channel transistor. The current supply portion 225 can include transistors 222 and 252 and transistors 223 and 253.

One of a source and a drain of the transistor 222 is electrically connected to a signal line FG. The other of the source and the drain of the transistor 222 is electrically connected to a gate of the transistor 223. One of a source and a drain of the transistor 252 is electrically connected to a signal line FGREF. The other of the source and the drain of the transistor 252 is electrically connected to a gate of the transistor 253. A gate of the transistor 222 and a gate of the transistor 252 are electrically connected to a wiring 213.

One of a source and a drain of the transistor 223 is electrically connected to the wiring 151. One of a source and a drain of the transistor 253 is electrically connected to the wiring 152. The other of the source and the drain of the transistor 223 and the other of the source and the drain of the transistor 253 are electrically connected to the high potential power supply line (VDD).

In the current supply portion 225, an appropriate signal potential is supplied to the signal lines FG and FGREF, a high potential ("H") is supplied to the wiring 213 to turn on the transistors 222 and 252 and the transistors 223 and 253, whereby a current can be supplied to the wiring 151 and the wiring 152.

The current mirror portion 226 can include a transistor 254 and a transistor 224. A gate of the transistor 254 and one of a source and a drain thereof are electrically connected to the wiring 152. One of a source and a drain of the transistor 224 is electrically connected to the wiring 151. The other of the source and the drain of the transistor 224 and the other of a source and a drain of the transistor 254 are electrically connected to the low potential power supply line (VSS). A gate of the transistor 224 is electrically connected to the gate of the transistor 254, and a current (ICM) that is the same as a current flowing through the transistor 254 can flow through the transistor 224.

Figure 5B:
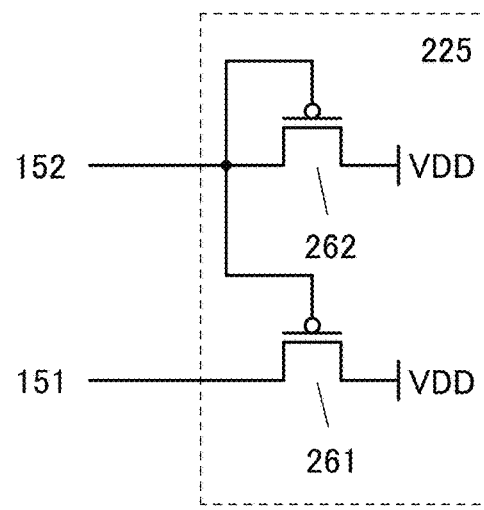

Note that the current supply portion 225 may include a p-channel transistor as illustrated in FIG. 5B. An output side of a transistor 262 is electrically connected to the wiring 152 and a gate of a transistor 261.

<Difference Extraction Circuit>

The circuit 240 is a difference extraction circuit, and can extract the product (product-sum operation result) of data and a weight coefficient by using currents flowing through the pixel 100 and the circuit 230. As illustrated in FIG. 2, the pixels 100 are electrically connected to each other through the wiring 151. The circuit 240 can perform arithmetic operation using the sum of currents flowing through the transistors 133 in the pixels 100.

The circuit 240 includes a capacitor 202, a transistor 203, a transistor 204, a transistor 205, a transistor 206, and a transistor 207 as a voltage converter circuit. An appropriate analog potential (Bias) is applied to a gate of the transistor 207.

One electrode of the capacitor 202 is electrically connected to one of a source and a drain of the transistor 203 and a gate of the transistor 204. One of a source and a drain of the transistor 204 is electrically connected to one of a source and a drain of the transistor 205 and one of a source and a drain of the transistor 206. The other electrode of the capacitor 202 is electrically connected to the wiring 151 and one of a source and a drain of the transistor 207.

Here, a point at which the one electrode of the capacitor 202, the one of the source and the drain of the transistor 203, and the gate of the transistor 204 are connected is referred to as a node C.

The other of the source and the drain of the transistor 203 is electrically connected to a wiring 218. The other of the source and the drain of the transistor 204 is electrically connected to a wiring 219. The other of the source and the drain of the transistor 205 is electrically connected to the reference power supply line such as the GND wiring. The other of the source and the drain of the transistor 206 is electrically connected to a wiring 212. The other of the source and the drain of the transistor 207 is electrically connected to the reference power supply line such as the GND wiring. A gate of the transistor 203 is electrically connected to a wiring 216. A gate of the transistor 205 is electrically connected to a wiring 215. A gate of the transistor 206 is electrically connected to a wiring 214.

The wirings 218 and 219 can each have a function of a power supply line. For example, the wiring 218 can have a function of a wiring for supplying a reset potential (Vr) for reading operation. The wiring 219 can function as the high potential power supply line. The wirings 214, 215, and 216 can function as signal lines that control the conduction of the respective transistors. The wiring 212 is an output line and can be electrically connected to the circuit 301 illustrated in FIG. 1, for example.

The transistor 203 can have a function of resetting the potential of the node C to the potential of the wiring 218. The transistors 204 and 205 can have a function of a source follower circuit. The transistor 206 can have a function of controlling reading operation. Note that the circuit 240 has a function of a correlated double sampling circuit (CDS circuit), and can be replaced with a circuit with another structure that has the function.

Operation

Next, operation of the imaging device of one embodiment of the present invention is described. In one embodiment of the present invention, first, data (reference data) when there is no difference between output of the circuit 10a and output of the circuit 10b in the pixel 100 is obtained. Next, image data is obtained by photoelectric conversion in each of the circuit 10a and the circuit 10b and difference data therebetween is obtained.

Next, a differential potential between data obtained by converting a current flowing from the circuit 230 to the circuit 240 into voltage on the basis of the reference data and the difference data and data obtained by converting a current flowing from the circuit 230 to the circuit 240 when weight is added to the reference data and the difference data into voltage is extracted in the circuit 240.

The differential potential corresponds to data obtained by eliminating various offset components from a current flowing through the circuit 220, and is data obtained by voltage conversion of a current represented by a term of the product of the difference data and the weight coefficient. In other words, the product of the difference data and the weight coefficient can be extracted.

In order to explain the whole flow of extraction of the product of the difference data and the weight coefficient, description of operation of the pixel 100 is omitted, and explanation is made on the assumption that a data potential X corresponding to difference data between the circuit 10a and the circuit 10b (a difference of data obtained by photoelectric conversion) is stored in the node P1 and a data potential (reference data, ideally 0) output by the circuit 20 when there is no difference between outputs of the circuit 10a and the circuit 10b is stored in the node P2. Detailed operation of the pixel 100 will be described later.

The pixel block 200 can eliminate offset components other than the product of difference data (potential X) and a weight coefficient (potential W) and extract the objective WX. The following is a WX extraction process in the case of using the circuit illustrated in FIG. 5A as the circuit 230.

First, in the circuit 240, the transistor 203 is brought into a conduction state so that a potential Vr is written from the wiring 218 to the node C. Here, the potential Vr is a reset potential used for reading operation.

At this time, difference data (potential X) is assumed to be written to the node P1 in the circuit 30 in the pixel 100. Furthermore, reference data 0 is assumed to be written to the node P2. In addition, a weight coefficient written from the wiring 128 is assumed to be 0.

At this time, the sum of currents flowing from the circuit 230 to the transistors 133 in the pixels 100 is $k\Sigma(X-V_{th})^2$. The sum of currents flowing from the circuit 230 to the transistors 143 in the pixels 100 is $k\Sigma(0-V_{th})^2$. Here, k is a constant and $V_{th}$ is the threshold voltage of each transistor.

In the circuit 230, the sum of currents flowing through the transistor 223 is represented by IC, the sum of currents flowing through the transistor 253 is represented by ICFEF, and a current flowing through the transistor 224 and the transistor 254 is represented by ICM (see FIG. 5A).

At this time, $ICREF_0$ (ICREF when the weight is 0)=$ICM_0+k\Sigma(0-V_{th})^2$, $ICM_0=ICREF_0-k\Sigma(0-V_{th})^2$.

Here, a current $IR_0$ (IR when the weight is 0) which flows through the transistor 207 in the circuit 240 is represented as follows: $IR_0=IC-ICM_0-k\Sigma(X-V_{th})^2$. This means $IR_0=IC-ICREF_0+k\Sigma(0-V_{th})^2-k\Sigma(X-V_{th})^2$.

Then, the transistor 203 in the circuit 240 is brought out of a conduction state, and the potential Vr is held in the node C.

Next, a potential corresponding to the weight coefficient (W) is supplied to the wiring 128, and the weight coefficient (W) is supplied to the node P1 and the node P2 by capacitive coupling.

At this time, the sum of currents flowing from the circuit 230 to the transistors 133 in the pixels 100 is $k\Sigma(X+W-V_{th})^2$. The sum of currents flowing from the circuit 230 to the transistors 143 in the pixels 100 is $k\Sigma(W-V_{th})^2$.

Thus, the current IR flowing through the transistor 207 in the circuit 240 is represented by $IR=IC-ICM-k\Sigma(X+W-V_{th})^2$. This means $IR=IC-ICREF+k\Sigma(W-V_{th})^2-k\Sigma(X+W-V_{th})^2$.

Here, the difference between $IR_0$ and IR is represented as follows: $IR_0-IR=k\Sigma(Vth^2-(X-Vth)^2-(W-Vth)^2+(W+X-Vth)^2)=k\Sigma(2WX)$. Thus, offset components are eliminated and a term consisting of WX can be extracted.

The above difference can be extracted by the circuit 240. $IR_0$ is initialized as the potential Vr in the node C, and the potential of the wiring 151 changes from a state of weight coefficient 0 to a state of weight coefficient W while the node C is in a floating state, whereby a difference Y of the potential (corresponding to a difference between $IR_0$ and IR) is added to the node C by capacitive coupling of the capacitor 202. Here, the node C becomes Vr+Y, and when the potential Vr is regarded as 0, Y is a potential itself obtained by converting the difference between $IR_0$ and IR into voltage. That is, WX can be extracted.

Figure 6:
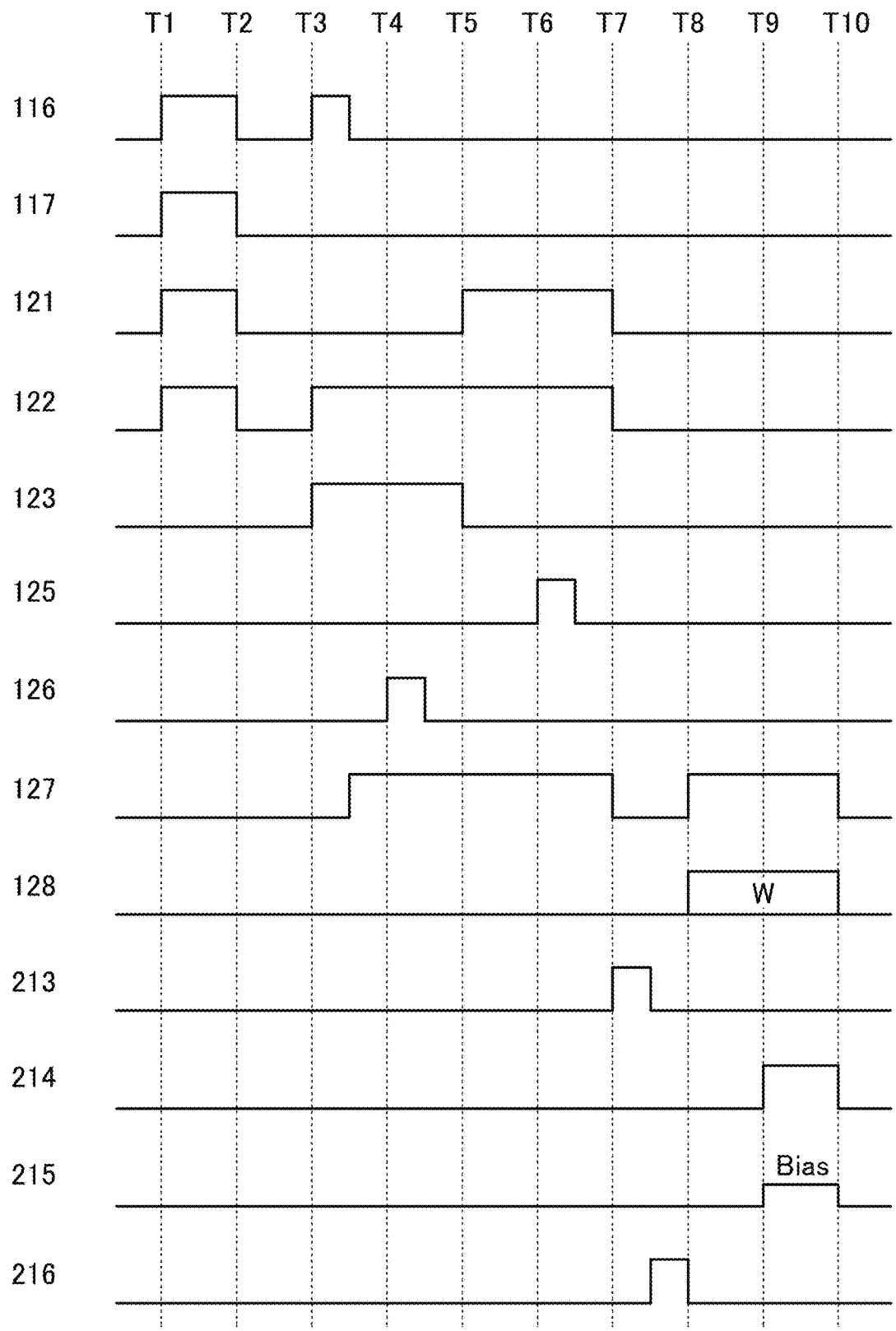
FIG. 6 is a timing chart illustrating operation of the pixel block 200.

Next, operation of the pixel 100 and operation of the pixel block 200 are described in accordance with the timing chart in FIG. 6. Note that the pixel 100 described here has the structure illustrated in FIG. 3. Furthermore, a predetermined potential is supplied to the power supply line and the like.

<Operation of Pixel 100>

At time T1, when the potential of the wiring 116 is set at "H", the potential of the wiring 117 is set at "H", the potential of the wiring 121 is set at "H", the potential of the wiring 122 is set at "H", and the potential of the wiring 123 is set at "L", the transistor 102 and the transistor 103 are turned on and the potential of the node FDa and the potential of the node FDb become a reset potential (the potential of the wiring 115) in the circuit 10a and the circuit 10b.

At time T2, when the potential of the wiring 116 is set at "L", the potential of the wiring 117 is set at "L", the potential of the wiring 121 is set at "L", the potential of the wiring 122 is set at "L", and the potential of the wiring 123 is set at "L", the transistor 102, the transistor 103, and the transistor 104 are turned off and the reset potential is held in the node FDa and the node FDb. Furthermore, the photoelectric conversion device 101 starts accumulation operation.

At time T3, when the potential of the wiring 116 is set at "H", the potential of the wiring 122 is set at "H", and the potential of the wiring 123 is set at "H", the transistor 102 is turned on and electric charges accumulated in the photoelectric conversion device 101 are transferred to the node FDa and the node FDb. After that, the potential of the wiring 116 is set at "L" and the potentials of the node FDa and the node FDb are held.

The transistor 104b and the transistor 107 are turned on, and the potential of the node FDb is input to a first input terminal (the gate of the transistor 105a) and a second input terminal (the gate of the transistor 105b) of the circuit 20.

At this time, a data potential amplified in accordance with a difference between data input to the first input terminal and data input to the second input terminal is output to the output terminal (the node N) of the circuit 20. Here, the data potential output to the output terminal (the node N) of the circuit 20 can be referred to as reference data. The reference data is output when there is no difference between the data input to the first input terminal and the data input to the second input terminal.

Note that in the case where the circuit 20 has the structure of FIG. 4B, the reference data is output when the node FDa and the node FDb are set at the reset potential.

At time T4, the potential of the wiring 126 is set at "H", the potential of the output terminal (the node N) of the circuit 20 is written to the node P2 in the circuit 30. After that, the potential of the wiring 126 is set at "L" and the potential of the node P2 is held. Note that before time T4, the potential of the wiring 127 is set at "H" and the potentials of the other electrodes of the capacitors 135 and 145 are set at the potential of the wiring 128 (e.g., 0).

At time T5, the potential of the wiring 121 is set at "H", the potential of the wiring 122 is set at "H", and the potential of the wiring 123 is set at "L", the transistor 104a is turned on, the transistor 107 is turned off, and the potential of the node FDa is written to the first input terminal of the circuit 20. Note that the potential of the node FDb is written to the second input terminal of the circuit 20.

Thus, a data potential amplified in accordance with a difference between the node FDa and the node FDb is output to the output terminal (the node N) of the circuit 20. Here, the data potential output to the output terminal (the node N) of the circuit 20 is a potential amplified in accordance with a difference between image data obtained by the circuit 10a and image data obtained by the circuit 10b, and can be referred to as difference data. Alternatively, it can be referred to as image data or imaging data.

At time T6, when the potential of the wiring 125 is set at "H", the potential of the output terminal (the node N) of the circuit 20 is written to the node P1 in the circuit 30. After that, the potential of the wiring 125 is set at "L" and the potential of the node P1 is held.

At time T7, when the potential of the wiring 121 is set at "L", the potential of the wiring 122 is set at "L", and the potential of the wiring 127 is set at "L", the transistor 104, the transistor 134, and the transistor 144 are turned off and a series of operations of the circuit 10a, the circuit 10b, and the circuit 20 are terminated.

<Operation of Circuit 220 and Circuit 230>

At time T7, when the potential of the wiring 213 is set at "H", an appropriate bias is supplied to gates of the transistor 222 and the transistor 252 in the circuit 230, so that a current IC flows through the transistor 223 and a current ICREF flows through the transistor 253 (see FIG. 5A). Then, the potential of the wiring 213 is set at "L".

Here, ICREF is the sum of a current (ICM) flowing through the transistor 254 and a current flowing through the transistor 143 in the circuit 30. The current IC is the sum of a current (ICM) flowing through the transistor 224, a current flowing through the transistor 133 in the circuit 30, and a current flowing through the transistor 207 in the circuit 240.

When the potential of the wiring 151 is determined in the above state, the potential of the wiring 216 is set at "H" and the potential "Vr" of the wiring 218 is written to the node C. Then, the potential of the wiring 216 is set at "L" and the node C is set into a floating state to hold the potential "Vr".

At time T8, when the potential of the wiring 127 is set at "H", the transistors 134 and 144 are turned on, and the potential W corresponding to the weight coefficient is supplied to the wiring 128, the potential W is supplied to potentials held in the node P1 and the node P2 in the circuit 30 by capacitive coupling. At this time, the state of weight coefficient 0 is changed to the state of weight coefficient W, so that a current flowing through the transistor 207 in the circuit 230 changes.

At this time, the amount "Y" of change in the potential of the wiring 151 is added to the node C by capacitive coupling of the capacitor 202. Here, the potential of the node C becomes "Vr+Y", and when potential "Vr"=0, the potential of the node C becomes a potential "Y" obtained by converting a difference of current flowing through the transistor 207 into voltage. In other words, WX can be extracted in accordance with the aforementioned current equation.

At time T9, when the potential of the wiring 214 is set at "H" and an appropriate bias is supplied to the wiring 215, due to the source follower operation, the circuit 240 can output a signal potential in accordance with WX to the wiring 212.

At time T10, the potential of the wiring 127 is set at "L", the potential of the wiring 213 is set at "L", the potential of the wiring 214 is set at "L", the potential of the wiring 215 is set at "L", so that reading operation is terminated.

WX output from the circuit 240 in the above manner can be input to the circuit 301.

Although an example in which simultaneous data is written to the node P1 and the node P2 and data based on the data is extracted is described above, there may be time difference between the data in the node P1 and the data in the node P2. For example, data in a first frame is written to the node P1 and data in a second frame is written to the node P2, whereby data including motion parallax can be extracted. Since data on the depth (distance) can be obtained from the motion parallax, stereoscopic vision can be formed.

<Circuits 301 and 302>

Figure 7A:
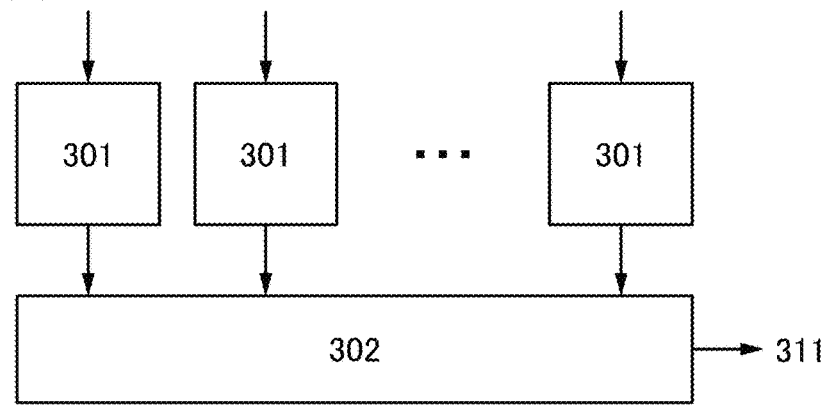
FIG. 7A and FIG. 7B are diagrams illustrating circuits 301 and a circuit 302.

FIG. 7A is a diagram illustrating the circuit 302 and the circuits 301 connected to the circuit 240. The result data of product-sum operation output from the circuit 240 are sequentially input to the circuits 301. The circuit 301 may have a variety of arithmetic functions. Alternatively, the function of the circuits 301 may be replaced by software processing.

For example, the circuits 301 can each include a circuit that performs arithmetic operation of an activation function. A comparator circuit can be used as the circuit, for example. A comparator circuit outputs a result of comparing input data and a set threshold as binary data. In other words, the pixel blocks 200 and the circuits 301 can operate as part of elements in a neural network.

The circuit 301 may include an A/D converter. When image data is output to the outside without product-sum operation or the like, analog data can be converted into digital data by the circuit 301. For example, the circuit 10a and the circuit 10b illustrated in FIG. 4A can be electrically connected to the circuit 301 through the wiring OUT.

Furthermore, in the case where the data output from the pixel blocks 200, which corresponds to image data of a plurality of bits, can be binarized by the circuits 301, the binarization can be rephrased as compression of image data.

Data output from the circuits 301 are sequentially input to the circuit 302. The circuit 302 can have a structure including a latch circuit, a shift register, and the like, for example. With this structure, parallel-serial conversion can be performed and data input in parallel can be output to a wiring 311 as serial data. The connection destination of the wiring 311 is not limited. For example, it can be connected to a neural network, a memory device, a communication device, or the like.

Figure 7B:
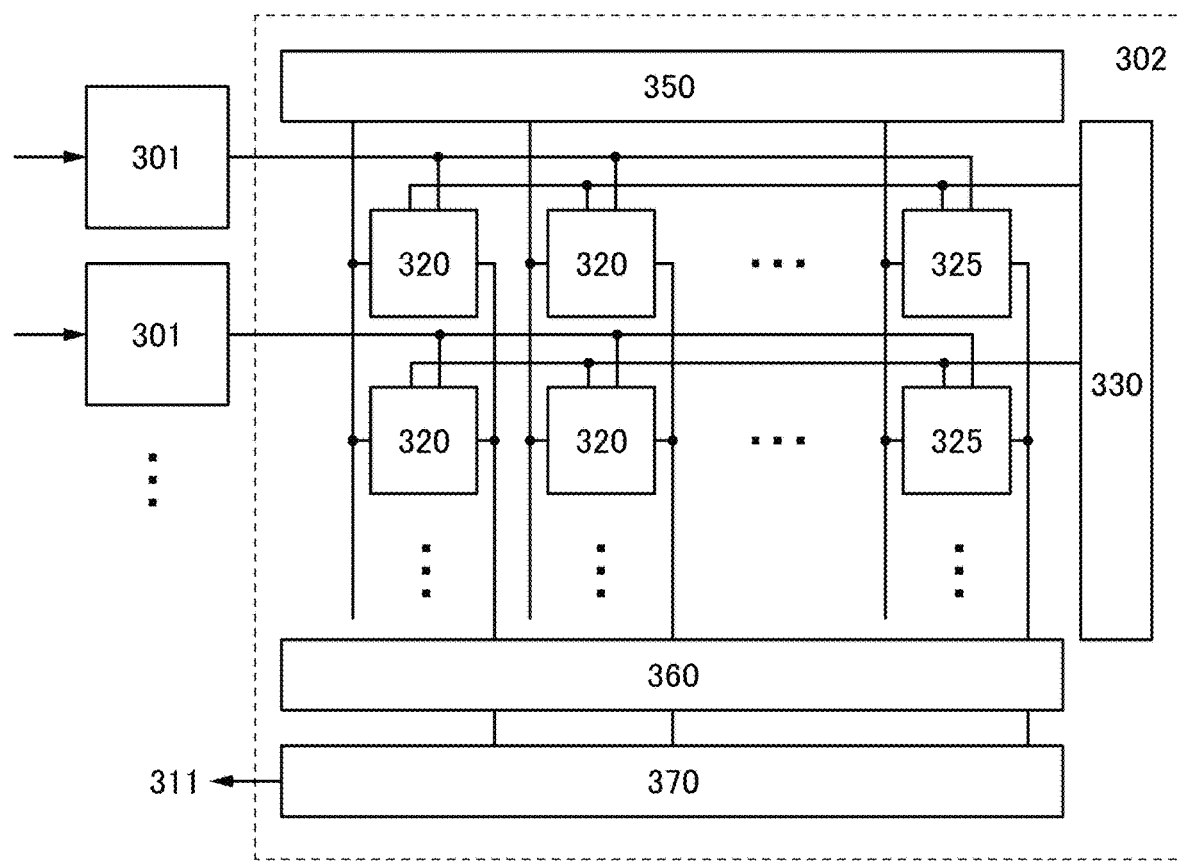

Moreover, as illustrated in FIG. 7B, the circuit 302 may have a neural network. The neural network includes memory cells arranged in a matrix, and each memory cell holds a weight coefficient. Data output from the circuits 301 are input to corresponding memory cells 320, and product-sum operation can be performed. Note that the number of memory cells illustrated in FIG. 7B is an example, and the number is not limited.

The neural network illustrated in FIG. 7B includes the memory cells 320 and reference memory cells 325 which are arranged in a matrix, a circuit 330, a circuit 350, a circuit 360, and a circuit 370.

Figure 8:
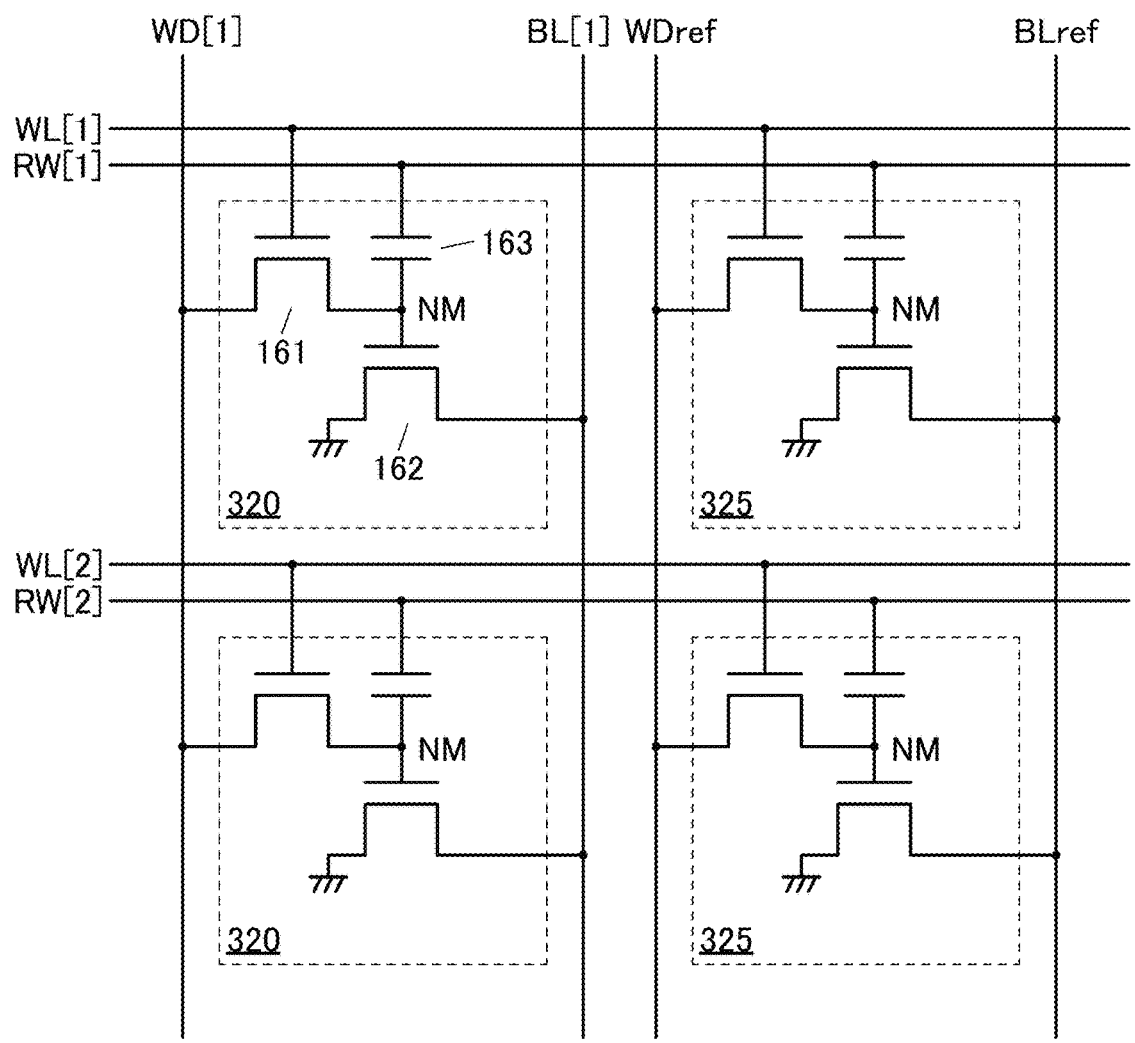
FIG. 8 is a diagram illustrating memory cells.

FIG. 8 illustrates an example of the memory cells 320 and the reference memory cells 325. The reference memory cells 325 are provided in an arbitrary one column. The memory cells 320 and the reference memory cells 325 have similar structures and each include a transistor 161, a transistor 162, and a capacitor 163.

One of a source and a drain of the transistor 161 is electrically connected to a gate of the transistor 162. The gate of the transistor 162 is electrically connected to one electrode of the capacitor 163. Here, a point where the one of the source and the drain of the transistor 161, the gate of the transistor 162, and the one electrode of the capacitor 163 are connected is referred to as a node NM.

A gate of the transistor 161 is electrically connected to a wiring WL. The other electrode of the capacitor 163 is electrically connected to a wiring RW. One of a source and a drain of the transistor 162 is electrically connected to a reference potential wiring such as a GND wiring.

In the memory cell 320, the other of the source and the drain of the transistor 161 is electrically connected to a wiring WD. The other of the source and the drain of the transistor 162 is electrically connected to a wiring BL.

In the reference memory cell 325, the other of the source and the drain of the transistor 161 is electrically connected to a wiring WDref. The other of the source and the drain of the transistor 162 is electrically connected to a wiring BLref.

The wiring WL is electrically connected to the circuit 330. As the circuit 330, a decoder, a shift register, or the like can be used.

The wiring RW is electrically connected to the circuit 301. Binary data output from the circuit 301 is written to each memory cell. Note that a sequential circuit such as a shift register may be included between the circuit 301 and the memory cells.

The wiring WD and the wiring WDref are electrically connected to the circuit 350. As the circuit 350, a decoder, a shift register, or the like can be used. The circuit 350 may include a D/A converter and an SRAM. The circuit 350 can output a weight coefficient to be written to the node NM.

The wiring BL and the wiring BLref are electrically connected to the circuit 360. The circuit 360 can have a structure equivalent to that of the circuit 240. By the circuit 360, a signal of a product-sum operation result from which offset components are eliminated can be obtained.

The circuit 360 is electrically connected to the circuit 370. The circuit 370 can also be referred to as an activation function circuit. The activation function circuit has a function of performing arithmetic operation for converting the signal input from the circuit 360 in accordance with a predefined activation function. As the activation function, for example, a sigmoid function, a tan h function, a softmax function, a ReLU function, a threshold function, or the like can be used. The signal converted by the activation function circuit is output to the outside as output data.

Figure 9A:
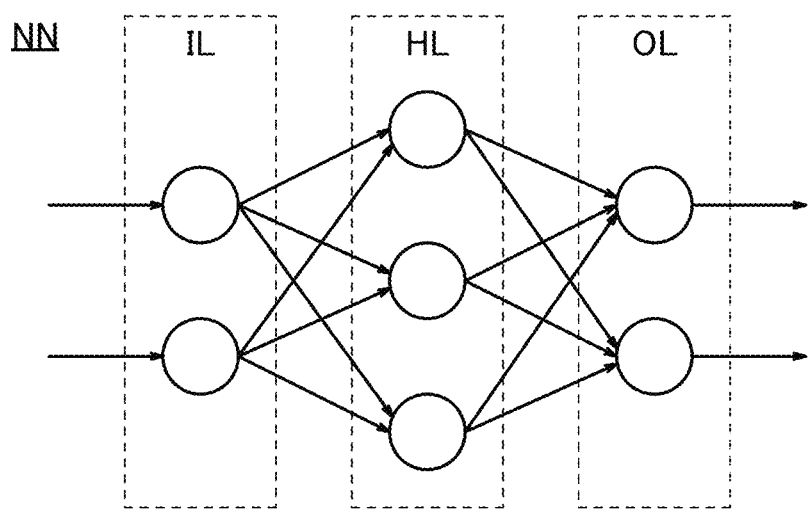
FIG. 9A and FIG. 9B are diagrams illustrating a structure example of a neural network.

As illustrated in FIG. 9A, a neural network NN can be formed of an input layer IL, an output layer OL, and a middle layer (hidden layer) HL. The input layer IL, the output layer OL, and the middle layer HL each include one or more neurons (units). Note that the middle layer HL may be composed of one layer or two or more layers. A neural network including two or more middle layers HL can also be referred to as a DNN (deep neural network). Learning using a deep neural network can also be referred to as deep learning.

Input data is input to each neuron in the input layer IL. A signal output from a neuron in the previous layer or the subsequent layer is input to each neuron in the middle layer HL. To each neuron in the output layer OL, output signals of the neurons in the previous layer are input. Note that each neuron may be connected to all the neurons in the previous and subsequent layers (full connection), or may be connected to some of the neurons.

Figure 9B:
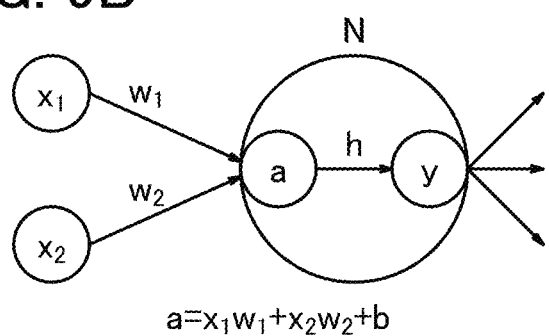

FIG. 9B illustrates an example of arithmetic operation with the neurons. Here, a neuron N and two neurons in the previous layer which output signals to the neuron N are illustrated. An output $x_1$ of a neuron in the previous layer and an output $x_2$ of a neuron in the previous layer are input to the neuron N. Then, in the neuron N, a total sum $x_1w_1+x_2w_2$ of a multiplication result ($x_1w_1$) of the output $x_1$ and a weight $w_1$ and a multiplication result ($x_2w_2$) of the output $x_2$ and a weight $w_2$ is calculated, and then a bias b is added as necessary, so that the value $a=x_1w_1+x_2w_2+b$ is obtained. Then, the value a is converted with an activation function h, and an output signal y=ah is output from the neuron N.

In this manner, the arithmetic operation with the neurons includes the arithmetic operation that sums the products of the outputs and the weights of the neurons in the previous layer, that is, the product-sum operation ($x_1w_1+x_2w_2$ described above). This product-sum operation may be performed using a program on software or may be performed using hardware.

In one embodiment of the present invention, an analog circuit is used as hardware to perform product-sum operation. In the case where an analog circuit is used as the product-sum operation circuit, the circuit scale of the product-sum operation circuit can be reduced, or higher processing speed and lower power consumption can be achieved by reduced frequency of access to a memory.

The product-sum operation circuit preferably has a structure including an OS transistor. An OS transistor is suitably used as a transistor included in an analog memory of the product-sum operation circuit because of its extremely low off-state current. Note that the product-sum operation circuit may be formed using both a Si transistor and an OS transistor.

This embodiment can be combined with the other embodiments as appropriate.

Embodiment 2

In this embodiment, structure examples and the like of the imaging device of one embodiment of the present invention will be described.

Structure Example

Figure 10A:
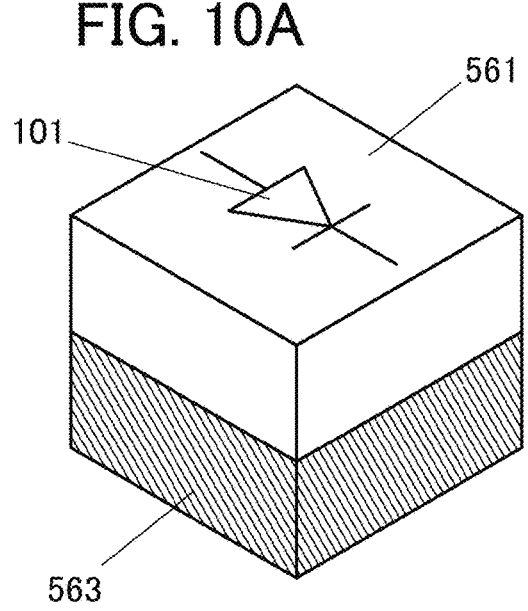
FIG. 10A to FIG. 10D are diagrams illustrating pixel structures of an imaging device.

FIG. 10A is a diagram illustrating a structure example of a pixel in an imaging device, and a stacked-layer structure of a layer 561 and a layer 563 can be employed.

Figure 11A:
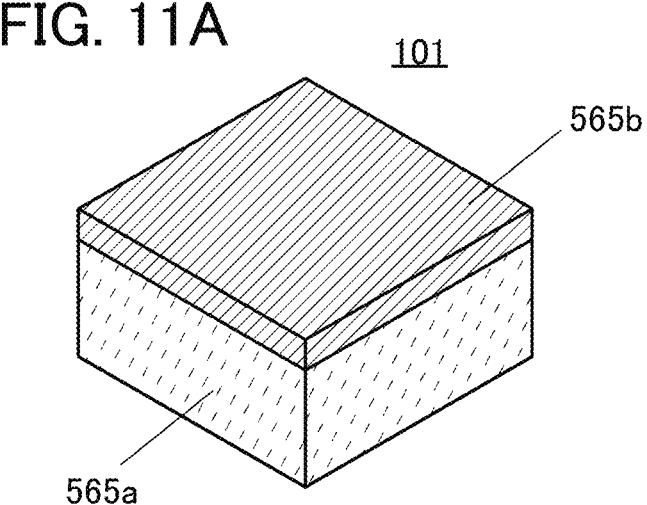
FIG. 11A to FIG. 11C are diagrams illustrating structures of a photoelectric conversion device.

The layer 561 includes the photoelectric conversion device 101. The photoelectric conversion device 101 can include a layer 565a and a layer 565b as illustrated in FIG. 11A. Note that a layer may be rephrased as a region, depending on the case.

The photoelectric conversion device 101 illustrated in FIG. 11A is a pn junction photodiode; for example, a p-type semiconductor can be used for the layer 565a, and an n-type semiconductor can be used for the layer 565b. Alternatively, an n-type semiconductor may be used for the layer 565a, and a p-type semiconductor may be used for the layer 565b.

The pn junction photodiode can be formed typically using single crystal silicon. A photodiode in which single crystal silicon is used for a photoelectric conversion layer has relatively wide spectral sensitivity to light from ultraviolet light to near-infrared light and can detect light of various wavelengths by being combined with an optical conversion layer described later.

Alternatively, a compound semiconductor may be used for the photoelectric conversion layer of the pn junction photodiode. As the compound semiconductor, gallium arsenic phosphide (GaAsP), gallium phosphide (GaP), indium gallium arsenide (InGaAs), lead sulfide (PbS), lead selenide (PbSe), indium arsenide (InAs), indium antimonide (InSb), mercury cadmium telluride (HgCdTe), or the like can be used, for example.

The compound semiconductor is preferably a compound semiconductor including a Group 13 element (e.g., aluminum, gallium, or indium) and a Group 15 element (e.g., nitrogen, phosphorus, arsenic, or antimony) (such a compound semiconductor is also referred to as a Group III-V compound semiconductor) or a compound semiconductor including a Group 12 element (e.g., magnesium, zinc, cadmium, or mercury) and a Group 16 element (e.g., oxygen, sulfur, selenium, or tellurium) (such a compound semiconductor is also referred to as a Group II-VI compound semiconductor).

The use of the compound semiconductor, which can change the bandgap depending on the combination of constituent elements and the atomic ratio of the elements, enables formation of a photodiode having sensitivity to a wide wavelength range from ultraviolet light to infrared light.

Note that the wavelength of ultraviolet light can be generally defined as the vicinity of 0.01 µm to the vicinity of 0.38 µm, the wavelength of visible light can be generally defined as the vicinity of 0.38 µm to the vicinity of 0.75 µm, the wavelength of near-infrared light can be generally defined as the vicinity of 0.75 µm to the vicinity of 2.5 µm), the wavelength of mid-infrared light can be generally defined as the vicinity of 2.5 µm to the vicinity of 4 µm, and the wavelength of far-infrared light can be generally defined as the vicinity of 4 µm to the vicinity of 1000 µm.

For example, to form a photodiode having sensitivity to light from ultraviolet light to visible light, GaP or the like can be used for the photoelectric conversion layer. To form a photodiode having sensitivity to light from ultraviolet light to near-infrared light, silicon, GaAsP, or the like described above can be used for the photoelectric conversion layer. Furthermore, to form a photodiode having sensitivity to light from visible light to mid-infrared light, InGaAs or the like can be used for the photoelectric conversion layer. To form a photodiode having sensitivity to light from near-infrared light to mid-infrared light, PbS, InAs, or the like can be used for the photoelectric conversion layer. To form a photodiode having sensitivity to light from mid-infrared light to far-infrared light, PbSe, InSb, HgCdTe, or the like can be used for the photoelectric conversion layer.

Note that the photodiodes using the above-described compound semiconductors may be pin junction photodiodes as well as pn junction photodiodes. Furthermore, the pn junction and the pin junction may have a heterojunction structure without being limited to a homojunction structure.

For example, in the heterojunction, a first compound semiconductor can be used as one layer of the pn junction structure, and a second compound semiconductor that is different from the first compound semiconductor can be used as the other layer. Furthermore, a first compound semiconductor can be used as any one or two layers of the pin junction structure, and a second compound semiconductor that is different from the first compound semiconductor can be used as the other layer(s). Note that one of the first compound semiconductor and the second compound semiconductor may be a semiconductor of a single element such as silicon.

Note that different materials may be used for different pixels in forming photoelectric conversion layers of photodiodes. With this structure, an imaging device which includes any two kinds of pixels or three kinds of pixels among a pixel that detects ultraviolet light, a pixel that detects visible light, a pixel that detects infrared light, and the like can be formed.

Figure 11B:
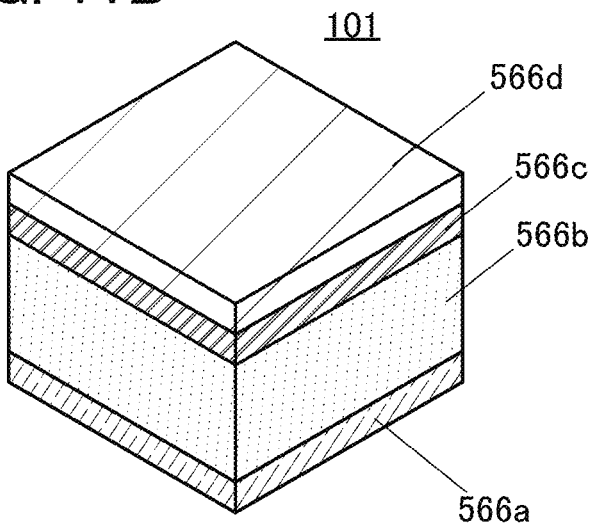

The photoelectric conversion device 101 included in the layer 561 may have a stacked-layer structure of a layer 566a, a layer 566b, a layer 566c, and a layer 566d as illustrated in FIG. 11B. The photoelectric conversion device 101 illustrated in FIG. 11B is an example of an avalanche photodiode, and the layer 566a and the layer 566d correspond to electrodes and the layers 566b and 566c correspond to a photoelectric conversion portion.

The layer 566a is preferably a low-resistance metal layer or the like. For example, aluminum, titanium, tungsten, tantalum, silver, or a stacked layer thereof can be used.

A conductive layer having a high light-transmitting property with respect to visible light is preferably used as the layer 566d. For example, indium oxide, tin oxide, zinc oxide, indium tin oxide, gallium zinc oxide, indium gallium zinc oxide, graphene, or the like can be used. Note that a structure in which the layer 566d is omitted can also be employed.

A structure of a pn junction photodiode containing a selenium-based material in a photoelectric conversion layer can be used for the layers 566b and 566c of the photoelectric conversion portion, for example. A selenium-based material, which is a p-type semiconductor, is preferably used for the layer 566b, and gallium oxide or the like, which is an n-type semiconductor, is preferably used for the layer 566c.

A photoelectric conversion device containing a selenium-based material has characteristics of high external quantum efficiency with respect to visible light. In the photoelectric conversion device, electrons are greatly amplified with respect to the amount of incident light by utilizing the avalanche multiplication. A selenium-based material has a high light-absorption coefficient and thus has advantages in production; for example, a photoelectric conversion layer can be formed using a thin film. A thin film of a selenium-based material can be formed by a vacuum evaporation method, a sputtering method, or the like.

As the selenium-based material, crystalline selenium (single crystal selenium or polycrystalline selenium) or amorphous selenium can be used. These selenium-based materials have sensitivity to light from ultraviolet light to visible light. Furthermore, a compound of copper, indium, and selenium (CIS), a compound of copper, indium, gallium, and selenium (CIGS), or the like can be used. These compounds have sensitivity to light from ultraviolet light to near-infrared light.

An n-type semiconductor is preferably formed using a material with a wide band gap and a light-transmitting property with respect to visible light. For example, zinc oxide, gallium oxide, indium oxide, tin oxide, or mixed oxide thereof can be used. In addition, these materials have a function of a hole-injection blocking layer, so that a dark current can be decreased.

Figure 11C:
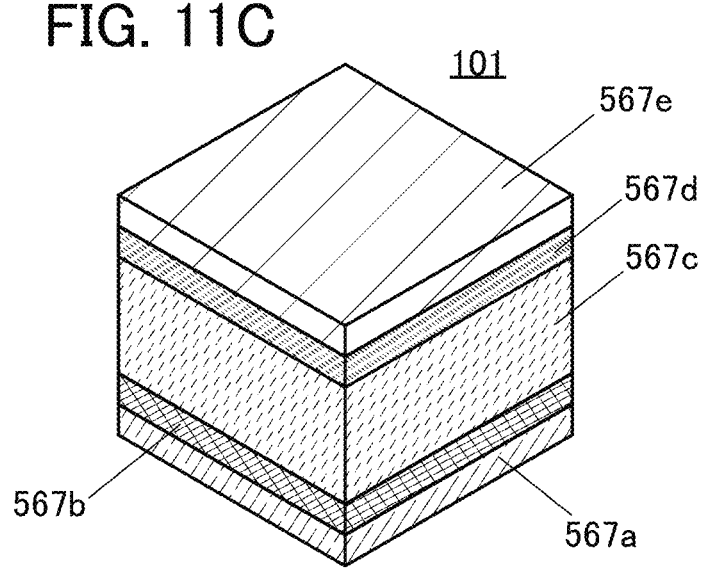

The photoelectric conversion device 101 included in the layer 561 may have a stacked-layer structure of a layer 567a, a layer 567b, a layer 567c, a layer 567d, and a layer 567e as illustrated in FIG. 11C. The photoelectric conversion device 101 illustrated in FIG. 11C is an example of an organic photoconductive film; the layer 567a is a lower electrode, the layer 567e is an upper electrode having a light-transmitting property, and the layers 567b, 567c, and 567d correspond to a photoelectric conversion portion.

One of the layers 567b and 567d in the photoelectric conversion portion can be a hole-transport layer and the other can be an electron-transport layer. The layer 567c can be a photoelectric conversion layer.

For the hole-transport layer, molybdenum oxide can be used, for example. For the electron-transport layer, fullerene such as $C_{60}$ or $C_{70}$, or a derivative thereof can be used, for example.

As the photoelectric conversion layer, a mixed layer of an n-type organic semiconductor and a p-type organic semiconductor (bulk heterojunction structure) can be used. There are various organic semiconductors, and a material having sensitivity to light with an intended wavelength is selected as a photoelectric conversion layer.

For the layer 563 illustrated in FIG. 10A, a silicon substrate can be used, for example. The silicon substrate includes a Si transistor or the like. With the use of the Si transistor, as well as a pixel circuit, a circuit for driving the pixel circuit, a circuit for reading out an image signal, an image processing circuit, a neural network, a communication circuit, or the like can be formed. Furthermore, a CPU (Central Processing Unit), an MCU (Micro Controller Unit), a memory circuit such as a DRAM (Dynamic Random Access Memory), or the like may be formed. Note that the above-described circuits except the pixel circuit are each referred to as a functional circuit in this embodiment.

For example, some or all of the transistors included in the pixel circuits (the pixels 100) and the functional circuits (the circuits 220, 301, 302, 303, 304, 305, and the like) described in Embodiment 1 can be provided in the layer 563.

Figure 10B:
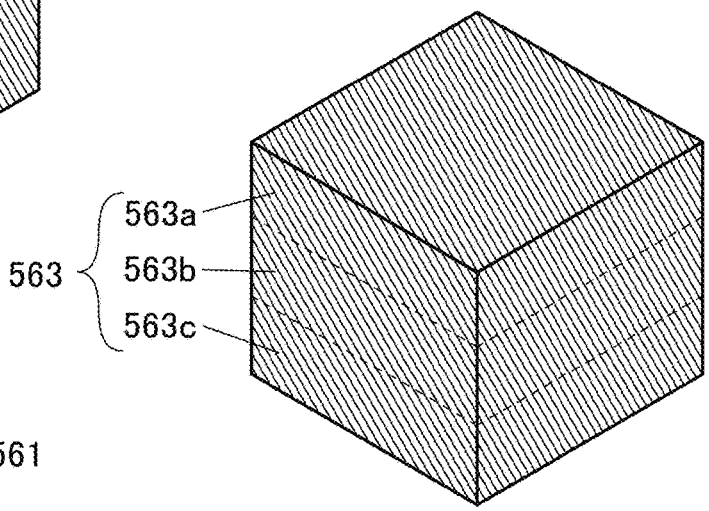

The layer 563 may be a stack of a plurality of layers as illustrated in FIG. 10B. Although FIG. 10B illustrates an example in which the layer 563 is composed of three layers 563a, 563b, and 563c, a two-layer structure may be employed as well. Alternatively, the layer 563 may be a stack of four or more layers. These layers can be stacked by a bonding process, for example. With this structure, the pixel circuits and the functional circuits can be dispersed in a plurality of layers; thus, the pixel circuits and the functional circuits can be provided to overlap with each other, which enables a small-sized and high-performance imaging device to be manufactured.

Figure 10C:
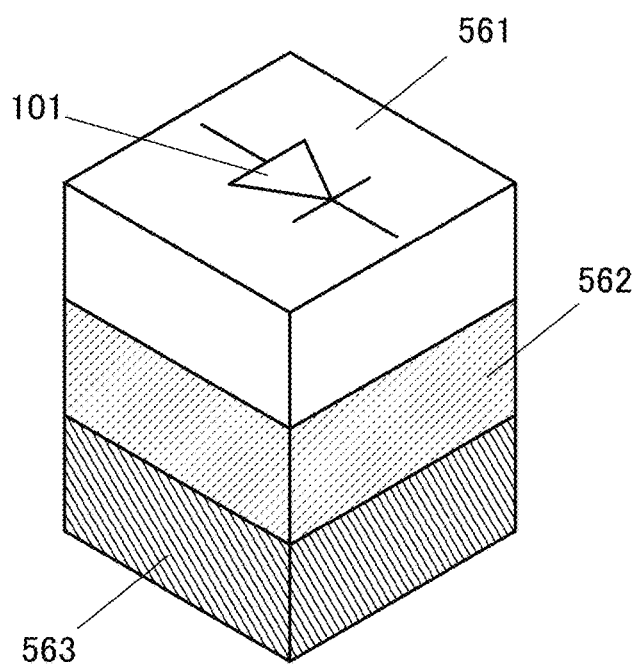

Furthermore, the pixel may have a stacked-layer structure of the layer 561, a layer 562, and the layer 563 as illustrated in FIG. 10C.

The layer 562 can include OS transistors. One or more of the functional circuits described above may be formed using OS transistors. Alternatively, one or more of the functional circuits may be formed using Si transistors included in the layer 563 and the OS transistors included in the layer 562. Alternatively, the layer 563 may be a support substrate such as a glass substrate, and the functional circuits may be formed using the OS transistors included in the layer 562.

A normally-off CPU (also referred to as "Noff-CPU") can be formed using an OS transistor and a Si transistor, for example. Note that the Noff-CPU is an integrated circuit including a normally-off transistor, which is in a non-conduction state (also referred to as an off state) even when a gate voltage is 0 V.

In the Noff-CPU, power supply to a circuit that does not need to operate can be stopped so that the circuit can be brought into a standby state. The circuit brought into the standby state because of the stop of power supply does not consume power. Thus, the power usage of the Noff-CPU can be minimized. Moreover, the Noff-CPU can hold data necessary for operation, such as setting conditions, for a long time even when power supply is stopped. The return from the standby state requires only restart of power supply to the circuit and does not require rewriting of setting conditions or the like. In other words, high-speed return from the standby state is possible. As described here, the Noff-CPU can have a reduced power consumption without a significant decrease in operation speed.

Figure 10D:
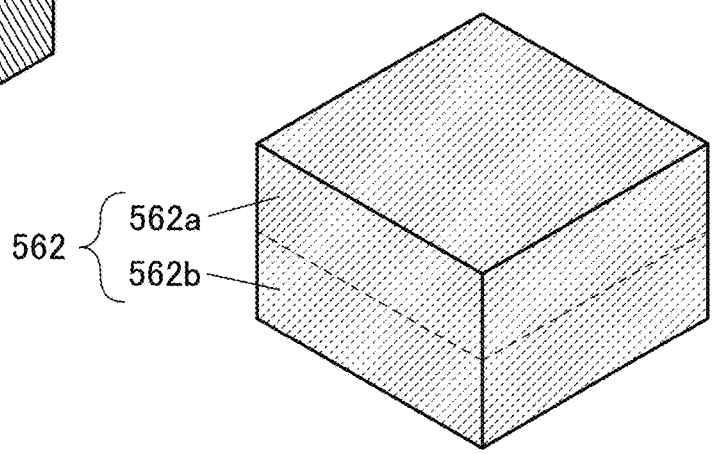

The layer 562 may be a stack of a plurality of layers as illustrated in FIG. 10D. Although FIG. 10D illustrates an example in which the layer 562 is composed of two layers 562a and 563b, a stack of three or more layers may be employed as well. These layers can be formed to be stacked over the layer 563, for example. Alternatively, the layers formed over the layer 563 and the layers formed over the layer 561 may be bonded to each other.

As a semiconductor material used for an OS transistor, a metal oxide whose energy gap is greater than or equal to 2 eV, preferably greater than or equal to 2.5 eV, further preferably greater than or equal to 3 eV can be used. A typical example thereof is an oxide semiconductor containing indium; and a CAAC-OS, a CAC-OS, each of which will be described later, or the like can be used, for example. A CAAC-OS has a crystal structure including stable atoms and is suitable for a transistor that is required to have high reliability, and the like. A CAC-OS has high mobility and is suitable for a transistor that operates at high speed, and the like.

In an OS transistor, a semiconductor layer has a large energy gap, and thus the OS transistor has an extremely low off-state current of several yoctoamperes per micrometer (current per micrometer of a channel width). An OS transistor has features such that impact ionization, an avalanche breakdown, a short-channel effect, or the like does not occur, which are different from those of a Si transistor. Thus, the use of an OS transistor enables formation of a circuit having high withstand voltage and high reliability. Moreover, variations in electrical characteristics due to crystallinity unevenness, which are caused in the Si transistor, are less likely to occur in OS transistors.

A semiconductor layer in an OS transistor can be, for example, a film represented by an In-M-Zn-based oxide that contains indium, zinc, and M (one or more selected from metals such as aluminum, titanium, gallium, germanium, yttrium, zirconium, lanthanum, cerium, tin, neodymium, and hafnium). The In-M-Zn-based oxide can be typically formed by a sputtering method. Alternatively, the In-M-Zn-based oxide may be formed by an ALD (Atomic layer deposition) method.

It is preferable that the atomic ratio of metal elements of a sputtering target used for forming the In-M-Zn-based oxide by a sputtering method satisfy In≥M and Zn≥M. The atomic ratio of metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio in the formed semiconductor layer may vary from the above atomic ratio of metal elements in the sputtering target in a range of ±40%.

An oxide semiconductor with low carrier density is used for the semiconductor layer. For example, for the semiconductor layer, an oxide semiconductor whose carrier density is lower than or equal to $1 \times 10^{17}/cm^3$, preferably lower than or equal to $1 \times 10^{15}/cm^3$, further preferably lower than or equal to $1 \times 10^{13}/cm^3$, still further preferably lower than or equal to $1 \times 10^{11}/cm^3$, even further preferably lower than $1 \times 10^{10}/cm^3$, and higher than or equal to $1 \times 10^{-9}/cm^3$ can be used. Such an oxide semiconductor is referred to as a highly purified intrinsic or substantially highly purified intrinsic oxide semiconductor. The oxide semiconductor has a low density of defect states and can thus be referred to as an oxide semiconductor having stable characteristics.

Note that the composition is not limited to those described above, and a material having the appropriate composition may be used depending on required semiconductor characteristics and electrical characteristics of the transistor (e.g., field-effect mobility and threshold voltage). To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon, which is one of elements belonging to Group 14, is contained in the oxide semiconductor contained in the semiconductor layer, oxygen vacancies are increased, and the semiconductor layer becomes n-type. Thus, the concentration of silicon or carbon (the concentration obtained by secondary ion mass spectrometry) in the semiconductor layer is set to lower than or equal to $2 \times 10^{18}$ atoms/$cm^3$, preferably lower than or equal to $2 \times 10^{17}$ atoms/$cm^3$.

Alkali metal and alkaline earth metal might generate carriers when bonded to an oxide semiconductor, in which case the off-state current of the transistor might be increased. Therefore, the concentration of alkali metal or alkaline earth metal in the semiconductor layer (the concentration obtained by secondary ion mass spectrometry) is set to lower than or equal to $1 \times 10^{18}$ atoms/$cm^3$, preferably lower than or equal to $2 \times 10^{16}$ atoms/$cm^3$.

When nitrogen is contained in the oxide semiconductor contained in the semiconductor layer, electrons serving as carriers are generated and the carrier density increases, so that the semiconductor layer easily becomes n-type. As a result, a transistor using an oxide semiconductor that contains nitrogen is likely to have normally-on characteristics. Hence, the nitrogen concentration (the concentration obtained by secondary ion mass spectrometry) in the semiconductor layer is preferably set to lower than or equal to $5 \times 10^{18}$ atoms/cm$^3$.

When hydrogen is contained in the oxide semiconductor contained in the semiconductor layer, hydrogen reacts with oxygen bonded to a metal atom to be water, and thus sometimes forms oxygen vacancies in the oxide semiconductor. When the channel formation region in the oxide semiconductor includes oxygen vacancies, the transistor sometimes has normally-on characteristics. In some cases, a defect in which hydrogen enters oxygen vacancies functions as a donor and generates electrons serving as carriers. In other cases, bonding of part of hydrogen to oxygen bonded to a metal atom generates electrons serving as carriers. Thus, a transistor using an oxide semiconductor that contains a large amount of hydrogen is likely to have normally-on characteristics.

A defect in which hydrogen enters oxygen vacancies can function as a donor of the oxide semiconductor. However, it is difficult to evaluate the defects quantitatively. Thus, the oxide semiconductor is sometimes evaluated by not its donor concentration but its carrier concentration. Therefore, in this specification and the like, the carrier concentration assuming the state where an electric field is not applied is sometimes used, instead of the donor concentration, as the parameter of the oxide semiconductor. That is, "carrier concentration" in this specification and the like can be replaced with "donor concentration" in some cases.

Therefore, hydrogen in the oxide semiconductor is preferably reduced as much as possible. Specifically, the hydrogen concentration of the oxide semiconductor, which is obtained by secondary ion mass spectrometry (SIMS), is lower than $1 \times 10^{20}$ atoms/cm$^3$, preferably lower than $1 \times 10^{19}$ atoms/cm$^3$, further preferably lower than $5 \times 10^{18}$ atoms/cm$^3$, still further preferably lower than $1 \times 10^{18}$ atoms/cm$^3$. When an oxide semiconductor with sufficiently reduced impurities such as hydrogen is used for a channel formation region of a transistor, stable electrical characteristics can be given.

The semiconductor layer may have a non-single-crystal structure, for example. Examples of the non-single-crystal structure include CAAC-OS (C-Axis Aligned Crystalline Oxide Semiconductor) including a c-axis aligned crystal, a polycrystalline structure, a microcrystalline structure, and an amorphous structure. Among the non-single-crystal structures, the amorphous structure has the highest density of defect states, whereas the CAAC-OS has the lowest density of defect states.

An oxide semiconductor film having an amorphous structure has disordered atomic arrangement and no crystalline component, for example. Alternatively, an oxide film having an amorphous structure has, for example, a completely amorphous structure and no crystal part.

Note that the semiconductor layer may be a mixed film including two or more of a region having an amorphous structure, a region having a microcrystalline structure, a region having a polycrystalline structure, a CAAC-OS region, and a region having a single crystal structure. The mixed film has, for example, a single-layer structure or a stacked-layer structure including two or more of the above regions in some cases.

The composition of a CAC (Cloud-Aligned Composite)-OS, which is one embodiment of a non-single-crystal semiconductor layer, will be described below.

A CAC-OS refers to one composition of a material in which elements constituting an oxide semiconductor are unevenly distributed with a size greater than or equal to 0.5 nm and less than or equal to 10 nm, preferably greater than or equal to 1 nm and less than or equal to 2 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 2 nm, or a similar size in an oxide semiconductor is hereinafter referred to as a mosaic pattern or a patch-like pattern.

Note that an oxide semiconductor preferably contains at least indium. It is particularly preferable that indium and zinc be contained. Moreover, in addition to these, one kind or a plurality of kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide (hereinafter, InO$_{X1}$ (X1 is a real number greater than 0)) or indium zinc oxide (hereinafter, In$_{X2}$Zn$_{Y2}$O$_{Z2}$ (X2, Y2, and Z2 are real numbers greater than 0)), and gallium oxide (hereinafter, GaO$_{X3}$ (X3 is a real number greater than 0)) or gallium zinc oxide (hereinafter, Ga$_{X4}$Zn$_{Y4}$O$_{Z4}$ (x$_4$, Y4, and Z4 are real numbers greater than 0)), and a mosaic pattern is formed. Then, InO$_{X1}$ or In$_{X2}$Zn$_{Y2}$O$_{Z2}$ forming the mosaic pattern is evenly distributed in the film (this composition is hereinafter also referred to as a cloud-like composition).

That is, the CAC-OS is a composite oxide semiconductor having a composition in which a region including GaO$_{X3}$ as a main component and a region including In$_{X2}$Zn$_{Y2}$O$_{Z2}$ or InO$_{X1}$ as a main component are mixed. Note that in this specification, for example, when the atomic ratio of In to an element M in a first region is larger than the atomic ratio of In to the element M in a second region, the first region is regarded as having a higher In concentration than the second region.

Note that IGZO is a commonly known name and sometimes refers to one compound formed of In, Ga, Zn, and O. A typical example is a crystalline compound represented by InGaO$_3$(ZnO)$_{m1}$ (m1 is a natural number) or In$_{(1+x0)}$Ga$_{(1-x0)}$O$_3$(ZnO)$_{m0}$ (−1≤x0≤1; m0 is a given number).

The above crystalline compound has a single crystal structure, a polycrystalline structure, or a CAAC structure. Note that the CAAC structure is a crystal structure in which a plurality of IGZO nanocrystals have c-axis alignment and are connected in the a-b plane without alignment.

On the other hand, the CAC-OS relates to the material composition of an oxide semiconductor. The CAC-OS refers to a composition in which, in the material composition containing In, Ga, Zn, and O, some regions that include Ga as a main component and are observed as nanoparticles and some regions that include In as a main component and are observed as nanoparticles are randomly dispersed in a mosaic pattern. Therefore, the crystal structure is a secondary element for the CAC-OS.

Note that the CAC-OS is regarded as not including a stacked-layer structure of two or more kinds of films with different compositions. For example, a two-layer structure of a film including In as a main component and a film including Ga as a main component is not included.

Note that a clear boundary cannot sometimes be observed between the region including $GaO_{X3}$ as a main component and the region including $In_{X2}Zn_{Y2}O_{Z2}$ or $InO_{X1}$ as a main component.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, the CAC-OS refers to a composition in which some regions that include the metal element(s) as a main component and are observed as nanoparticles and some regions that include In as a main component and are observed as nanoparticles are randomly dispersed in a mosaic pattern.

The CAC-OS can be formed by a sputtering method under a condition where a substrate is not heated intentionally, for example. Moreover, in the case of forming the CAC-OS by a sputtering method, any one or more selected from an inert gas (typically, argon), an oxygen gas, and a nitrogen gas are used as a deposition gas. Furthermore, the ratio of the flow rate of an oxygen gas to the total flow rate of the deposition gas at the time of deposition is preferably as low as possible, and for example, the ratio of the flow rate of the oxygen gas is preferably higher than or equal to 0% and lower than 30%, further preferably higher than or equal to 0% and lower than or equal to 10%.

The CAC-OS is characterized in that no clear peak is observed in measurement using θ/2θ scan by an Out-of-plane method, which is one of X-ray diffraction (XRD) measurement methods. That is, it is found from the X-ray diffraction measurement that no alignment in the a-b plane direction and the c-axis direction is observed in a measured region.

In addition, in an electron diffraction pattern of the CAC-OS which is obtained by irradiation with an electron beam with a probe diameter of 1 nm (also referred to as a nanobeam electron beam), a ring-like high-luminance region (ring region) and a plurality of bright spots in the ring region are observed. It is therefore found from the electron diffraction pattern that the crystal structure of the CAC-OS includes an nc (nano-crystal) structure with no alignment in the plan-view direction and the cross-sectional direction.

Moreover, for example, it can be confirmed by EDX mapping obtained using energy dispersive X-ray spectroscopy (EDX) that the CAC-OS in the In—Ga—Zn oxide has a composition in which regions including $GaO_{X3}$ as a main component and regions including $In_{X2}Zn_{Y2}O_{Z2}$ or $InO_{X1}$ as a main component are unevenly distributed and mixed.

The CAC-OS has a composition different from that of an IGZO compound in which the metal elements are evenly distributed, and has characteristics different from those of the IGZO compound. That is, in the CAC-OS, the region including $GaO_{X3}$ or the like as a main component and the region including $In_{X2}Zn_{Y2}O_{Z2}$ or $InO_{X1}$ as a main component are separated to form a mosaic pattern.

Here, a region including $In_{X2}Zn_{Y2}O_{Z2}$ or $InO_{X1}$ as a main component is a region whose conductivity is higher than that of a region including $GaO_{X3}$ or the like as a main component. In other words, when carriers flow through the regions including $In_{X2}Zn_{Y2}O_{Z2}$ or $InO_{X1}$ as a main component, the conductivity of an oxide semiconductor is exhibited. Accordingly, when the regions including $In_{X2}Zn_{Y2}O_{Z2}$ or $InO_{X1}$ as a main component are distributed in an oxide semiconductor like a cloud, high field-effect mobility (μ) can be achieved.

By contrast, a region including $GaO_{X3}$ or the like as a main component is a region whose insulating property is higher than that of a region including $In_{X2}Zn_{Y2}O_{Z2}$ or $InO_{X1}$ as a main component. In other words, when the regions including $GaO_{X3}$ or the like as a main component are distributed in an oxide semiconductor, a leakage current can be suppressed and favorable switching operation can be achieved.

Accordingly, when the CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and high field-effect mobility (μ) can be achieved.

A semiconductor element using the CAC-OS has high reliability. Thus, the CAC-OS is suitably used as a constituent material of a variety of semiconductor devices.

<Stacked-Layer Structure 1>

Next, a stacked-layer structure of the imaging device will be described with reference to a cross-sectional view. Note that components such as insulating layers and conductive layers are described below as examples, and other components may be further included. Alternatively, some components described below may be omitted. A stacked-layer structure described below can be formed by a bonding process, a polishing process, or the like as needed.

Figure 12:
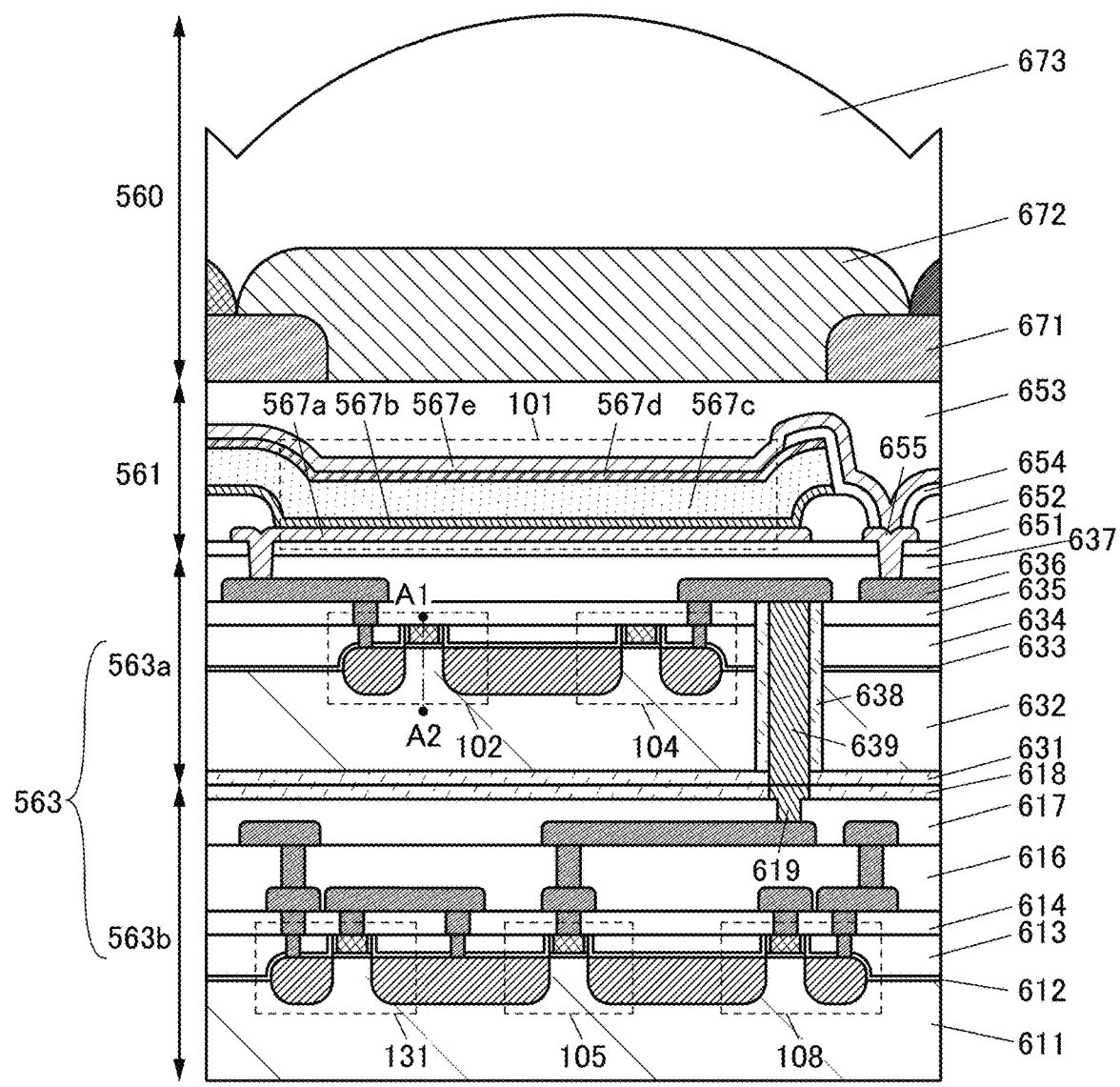
FIG. 12 is a cross-sectional view illustrating a pixel.

FIG. 12 is an example of a cross-sectional view of a stack including a layer 560, the layer 561, and the layer 563 and including a bonding surface between the layer 563a and the layer 563b of the layer 563.

<Layer 563b>

The layer 563b can include a functional circuit provided on a silicon substrate 611. Here, the transistor 105, the transistor 108, and the transistor 131 each included in the circuit 20 are illustrated as part of the functional circuit.

The silicon substrate 611 and insulating layers 612, 613, 614, 616, 617, and 618 are provided in the layer 563b. The insulating layer 612 functions as a protective film. The insulating layers 613, 613, 616, and 617 function as interlayer insulating films and planarization films. The insulating layer 618 and a conductive layer 619 function as bonding layers. The conductive layer 619 is electrically connected to a gate of the transistor 105.

As the protective film, for example, a silicon nitride film, a silicon oxide film, an aluminum oxide film, or the like can be used. As the interlayer insulating film and the planarization film, for example, an inorganic insulating film such as a silicon oxide film or an organic insulating film of an acrylic resin, a polyimide resin, or the like can be used. As the dielectric layer of the capacitor, a silicon nitride film, a silicon oxide film, an aluminum oxide film, or the like can be used. The bonding layers will be described later.

As a conductor that can be used for a wiring, an electrode, and a plug used for electrical connection between devices, a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements as its component; an alloy containing a combination of the above metal elements; or the like is selected and used as appropriate. The conductor is not limited to a single layer, and may be a plurality of layers including different materials.

<Layer 563a>

The layer 563a includes a component of the pixel 100. In addition, a component of the functional circuit may be included. Here, the transistor 102 is shown as a component of the pixel 100. Furthermore, the transistor 104 included in the circuit 20 is shown as a component of the functional circuit.

A silicon substrate 632 and insulating layers 631, 633, 634, 635, 637, and 638 are provided in the layer 563a. In addition, conductive layers 636 and 639 are provided.

The insulating layer 631 and the conductive layer 639 function as bonding layers. The insulating layers 634, 635, and 637 function as interlayer insulating films and planarization films. The insulating layer 633 functions as a protective film. The insulating layer 638 has a function of insulating the silicon substrate 632 from the conductive layer 639. The insulating layer 638 can be formed using a material similar to that for another insulating layer. The insulating layer 638 may be formed using the same material as that for the insulating layer 631.

The conductive layer 639 is electrically connected to the other of the source and the drain of the transistor 105 and the conductive layer 619. The conductive layer 636 is electrically connected to the wiring 114 (see FIG. 3).

Figure 13A:
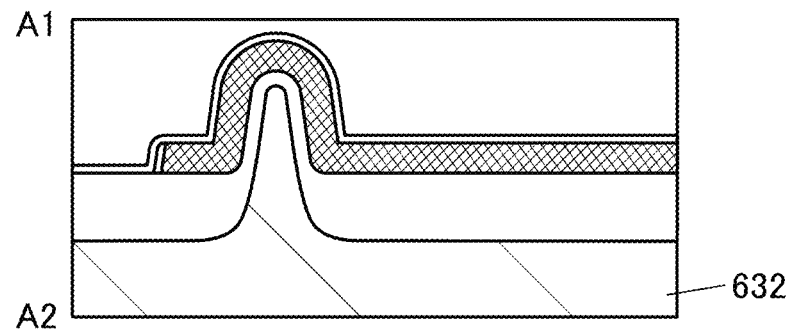
FIG. 13A to FIG. 13C are diagrams illustrating Si transistors.
Figure 13B:
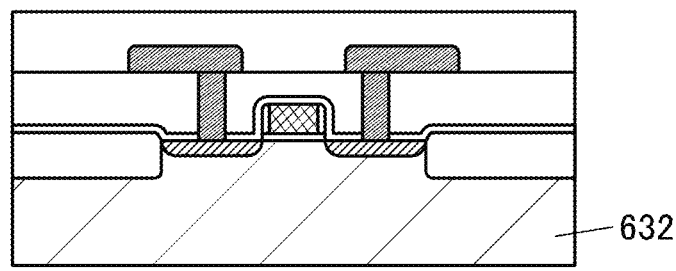

Si transistors illustrated in FIG. 12 are fin-type transistors including channel formation regions in the silicon substrates (the silicon substrates 611 and 632). FIG. 13A illustrates a cross section (a cross section along A1-A2 in the layer 563a in FIG. 12) in the channel width direction. Note that the Si transistors may each be a planar-type transistor as illustrated in FIG. 13B.

Figure 13C:
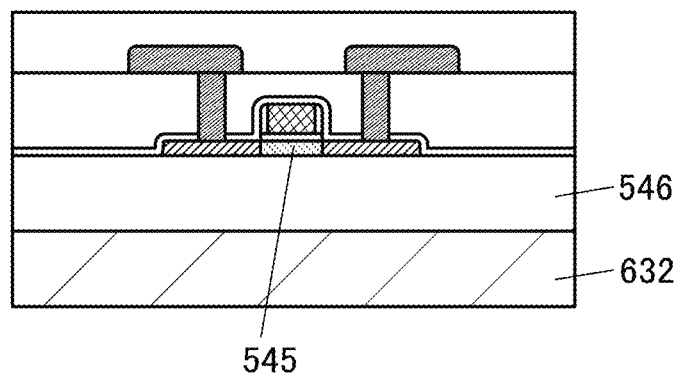

Alternatively, as illustrated in FIG. 13C, a transistor including a semiconductor layer 545 of a silicon thin film may be used. The semiconductor layer 545 can be single crystal silicon (SOI (Silicon on Insulator)) formed on an insulating layer 546 on the silicon substrate 611, for example.

<Layer 561>

The layer 561 includes the photoelectric conversion device 101. The photoelectric conversion device 101 can be formed over the layer 563a. FIG. 12 illustrates the photoelectric conversion device 101 having a structure in which the organic photoconductive film illustrated in FIG. 11C is used as the photoelectric conversion layer. Here, the layer 567a is a cathode, and the layer 567e is an anode.

Insulating layers 651, 652, 653, and 654 and a conductive layer 655 are provided in the layer 561.

The insulating layers 651, 653, and 654 function as interlayer insulating films and planarization films. The insulating layer 654 is provided to cover an end portion of the photoelectric conversion device 101, and has a function of preventing a short circuit between the layer 567e and the layer 567a. The insulating layer 652 functions as an element isolation layer. An organic insulating film or the like is preferably used as the element isolation layer.

The layer 567a corresponding to the cathode of the photoelectric conversion device 101 is electrically connected to one of the source and the drain of the transistor 102 included in the layer 563a. The layer 567e corresponding to the anode of the photoelectric conversion device 101 is electrically connected to the conductive layer 636 included in the layer 563a through the conductive layer 655.

<Layer 560>

The layer 560 is formed over the layer 561. The layer 560 includes a light-blocking layer 671, an optical conversion layer 672, and a microlens array 673.

The light-blocking layer 671 can suppress entry of light into an adjacent pixel. As the light-blocking layer 671, a metal layer of aluminum, tungsten, or the like can be used. The metal layer and a dielectric film functioning as an anti-reflection film may be stacked.

Figure 19A:
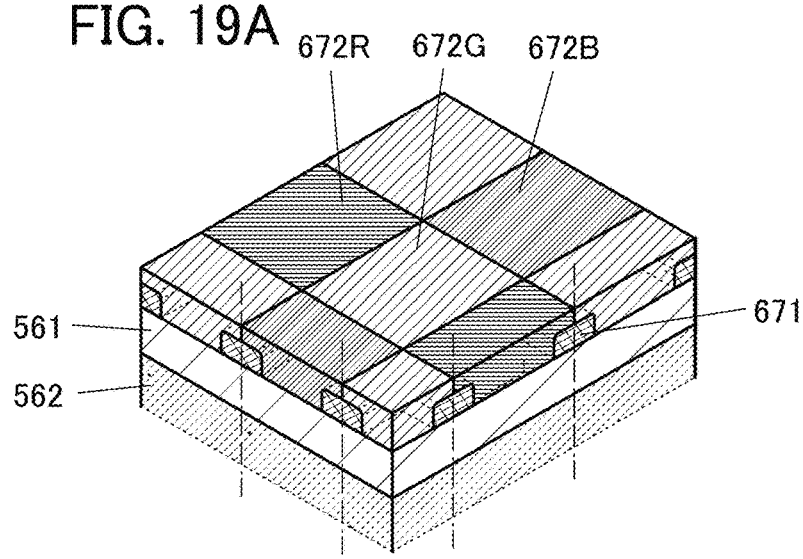
FIG. 19A to FIG. 19C are perspective views (cross-sectional views) illustrating pixels.

When the photoelectric conversion device 101 has sensitivity to visible light, a color filter can be used as the optical conversion layer 672. When colors of (red), G (green), B (blue), Y (yellow), C (cyan), M (magenta), and the like are assigned to the color filters of different pixels, a color image can be obtained. For example, as illustrated in a perspective view (including a cross section) of FIG. 19A, a color filter 672R (red), a color filter 672G (green), and a color filter 672B (blue) can be assigned to different pixels.

When a wavelength cut filter is used as the optical conversion layer 672 in the appropriate combination of the photoelectric conversion device 101 and the optical conversion layer 672, the imaging device can capture images in various wavelength regions.

For example, when an infrared filter that blocks light having a wavelength shorter than or equal to that of visible light is used as the optical conversion layer 672, an infrared imaging device can be obtained. When a filter that blocks light having a wavelength shorter than or equal to that of near infrared light is used as the optical conversion layer 672, a far-infrared imaging device can be obtained. When an ultraviolet filter that blocks light having a wavelength longer than or equal to that of visible light is used as the optical conversion layer 672, an ultraviolet imaging device can be obtained.

Figure 19B:
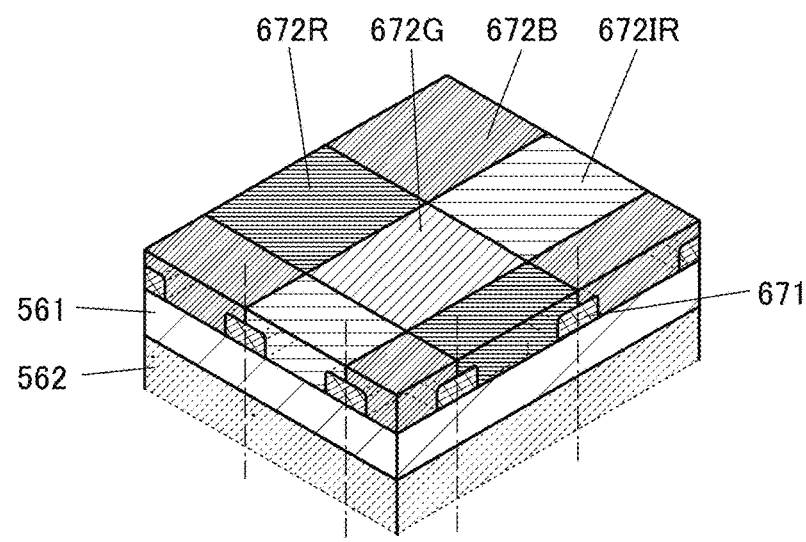

Note that different optical conversion layers may be provided in one imaging device. For example, as illustrated in FIG. 19B, the color filter 672R (red), the color filter 672G (green), the color filter 672B (blue), and an infrared filter 672IR can be assigned to different pixels. With this structure, a visible light image and an infrared light image can be obtained simultaneously.

Figure 19C:
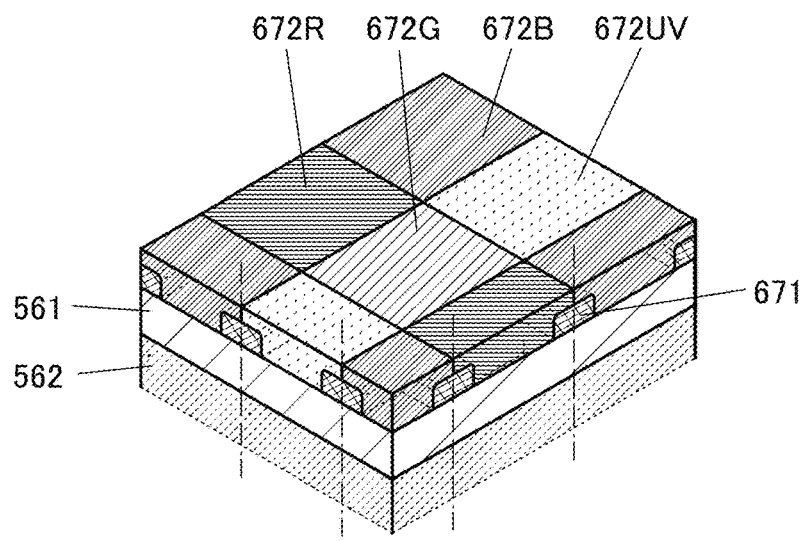

Alternatively, as illustrated in FIG. 19C, the color filter 672R (red), the color filter 672G (green), the color filter 672B (blue), and an ultraviolet filter 672UV can be assigned to different pixels. With this structure, a visible light image and an ultraviolet light image can be obtained simultaneously.

Furthermore, when a scintillator is used as the optical conversion layer 672, an imaging device that obtains an image visualizing the intensity of radiation, which is used for an X-ray imaging device or the like, can be obtained. Radiation such as X-rays passes through an object and enters the scintillator, and then is converted into light (fluorescence) such as visible light or ultraviolet light owing to a photoluminescence phenomenon. Then, the photoelectric conversion device 101 detects the light to obtain image data. Furthermore, the imaging device having this structure may be used in a radiation detector or the like.

A scintillator contains a substance that, when irradiated with radiation such as X-rays or gamma-rays, absorbs energy of the radiation to emit visible light or ultraviolet light. For example, a resin or ceramics in which $Gd_2O_2S$:Tb, $Gd_2O_2S$:Pr, $Gd_2O_2S$:Eu, BaFCl:Eu, NaI, CsI, $CaF_2$, $BaF_2$, $CeF_3$, LiF, Lil, ZnO, or the like is dispersed can be used.

Image capturing with the use of infrared light or ultraviolet light can provide the imaging device with an inspection function, a security function, a sensor function, or the like. For example, by image capturing with the use of infrared light, non-destructive inspection of products, sorting of agricultural products (e.g., sugar content meter function), vein authentication, medical inspection, or the like can be performed. Furthermore, by image capturing with the use of ultraviolet light, detection of ultraviolet light released from a light source or a frame can be performed, whereby a light source, a heat source, a production device, or the like can be controlled, for example.

The microlens array 673 is provided over the optical conversion layer 672. Light passing through an individual lens of the microlens array 673 goes through the optical conversion layer 672 directly under the lens, and the photoelectric conversion device 101 is irradiated with the light. With the microlens array 673, collected light can be incident on the photoelectric conversion device 101; thus, photoelectric conversion can be efficiently performed. The microlens array 673 is preferably formed using a resin, glass, or the like having a high light transmitting property with respect to light with an intended wavelength.

<Bonding>

Next, bonding of the layer 563*b* and the layer 563*a* will be described.

The insulating layer 618 and the conductive layer 619 are provided in the layer 563*b*. The conductive layer 619 includes a region embedded in the insulating layer 618. Furthermore, the surfaces of the insulating layer 618 and the conductive layer 619 are planarized to be level with each other.

The insulating layer 631 and the conductive layer 639 are provided in the layer 563*a*. The conductive layer 639 includes a region embedded in the insulating layer 631. Furthermore, the surfaces of the insulating layer 631 and the conductive layer 639 are planarized to be level with each other.

Here, a main component of the conductive layer 619 and a main component of the conductive layer 639 are preferably the same metal element. Furthermore, the insulating layer 618 and the insulating layer 631 are preferably formed of the same component.

For the conductive layers 619 and 639, Cu, Al, Sn, Zn, W, Ag, Pt, or Au can be used, for example. Preferably, Cu, Al, W, or Au is used for easy bonding. In addition, for the insulating layers 618 and 631, silicon oxide, silicon oxynitride, silicon nitride oxide, silicon nitride, titanium nitride, or the like can be used.

That is, the same metal material described above is preferably used for the conductive layer 619 and the conductive layer 639. Furthermore, the same insulating material described above is preferably used for the insulating layer 618 and the insulating layer 631. With this structure, bonding can be performed at the boundary between the layer 563*b* and the layer 563*a*.

Note that the conductive layer 619 and the conductive layer 639 may each have a multilayer structure of a plurality of layers; in that case, the outer layers (bonding surfaces) are formed of the same metal material. The insulating layer 618 and the insulating layer 631 may each have a multilayer structure of a plurality of layers; in that case, the outer layers (bonding surfaces) are formed of the same insulating material.

Through the above bonding, the electrical connection between the conductive layer 619 and the conductive layer 639 can be obtained. Moreover, the connection between the insulating layer 618 and the insulating layer 631 with mechanical strength can be obtained.

For bonding metal layers to each other, a surface activated bonding method in which an oxide film, a layer adsorbing impurities, and the like on the surface are removed by sputtering or the like and the cleaned and activated surfaces are brought into contact to be bonded to each other can be used. Alternatively, a diffusion bonding method in which the surfaces are bonded to each other by using temperature and pressure together can be used, for example. Both methods cause bonding at an atomic level, and therefore not only electrically but also mechanically excellent bonding can be obtained.

Furthermore, for bonding insulating layers to each other, a hydrophilic bonding method or the like can be used; in the method, after high planarity is obtained by polishing or the like, the surfaces of the insulating layers subjected to hydrophilicity treatment with oxygen plasma or the like are arranged in contact with and bonded to each other temporarily, and then dehydrated by heat treatment to perform final bonding. The hydrophilic bonding method can also cause bonding at an atomic level; thus, mechanically excellent bonding can be obtained.

When the layer 563*b* and the layer 563*a* are bonded to each other, the insulating layers and the metal layers coexist on their bonding surfaces; therefore, the surface activated bonding method and the hydrophilic bonding method are performed in combination, for example.

For example, a method can be used in which the surfaces are made clean after polishing, the surfaces of the metal layers are subjected to antioxidant treatment and hydrophilicity treatment, and then bonding is performed. Furthermore, hydrophilicity treatment may be performed on the surfaces of the metal layers being hardly oxidizable metal such as Au. Note that a bonding method other than the above-mentioned methods may be used.

The above bonding allows the circuit included in the layer 563*b* to be electrically connected to the components of the pixel 100 included in the layer 563*a*.

Modification Example of Stacked-Layer Structure 1

Figure 14:
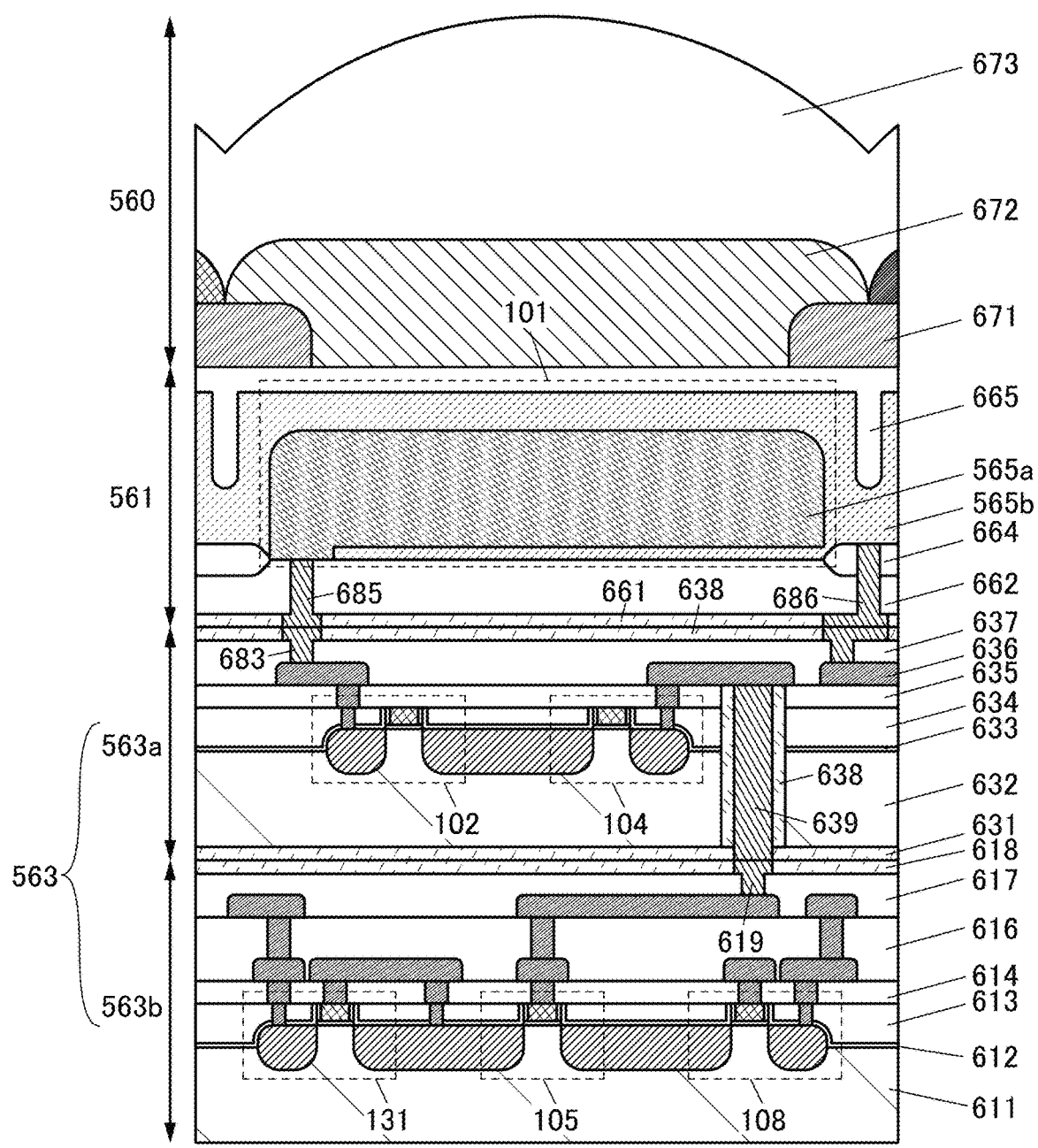
FIG. 14 is a cross-sectional view illustrating a pixel.

FIG. 14 is a modification example of the stacked-layer structure illustrated in FIG. 12 and differs from FIG. 12 in the structure of the photoelectric conversion device 101 included in the layer 561 and part of the structure of the layer 563*a*; a bonding surface is also included between the layer 561 and the layer 563*a*.

The layer 561 includes the photoelectric conversion device 101, insulating layers 661, 662, 664, and 665, and conductive layers 685 and 686.

The photoelectric conversion device 101 is a pn junction photodiode and includes the layer 565*b* corresponding to a p-type region and the layer 565*a* corresponding to an n-type region. Note that an example where a pn junction photodiode is formed over a silicon substrate is described here. The photoelectric conversion device 101 is a pinned photodiode, which can suppress a dark current and reduce noise with the thin p-type region (part of the layer 565*b*) provided on the surface side (current extraction side) of the layer 565*a*.

The insulating layer 661 and the conductive layers 685 and 686 function as bonding layers. The insulating layer 662 functions as an interlayer insulating film and a planarization film. The insulating layer 664 functions as an element isolation layer.

The silicon substrate is provided with a groove that separates pixels, and the insulating layer 665 is provided on the top surface of the silicon substrate and in the groove. The insulating layer 665 can suppress leakage of carriers generated in the photoelectric conversion device 101 to an adjacent pixel. The insulating layer 665 also has a function of suppressing entry of stray light. Therefore, color mixture can be suppressed with the insulating layer 665. Note that an anti-reflection film may be provided between the top surface of the silicon substrate and the insulating layer 665.

The insulating layer 664 can be formed by a LOCOS (LOCal Oxidation of Silicon) method. Alternatively, an STI (Shallow Trench Isolation) method or the like may be used for the formation. As the insulating layer 665, for example, an inorganic insulating film of silicon oxide, silicon nitride, or the like or an organic insulating film of a polyimide resin, an acrylic resin, or the like can be used. Note that the insulating layer 665 may have a multilayer structure. A space may be provided in part of the insulating layer 665. The space may contain a gas such as the air or an inert gas. Moreover, the space may be in a reduced pressure state.

The layer 565a (corresponding to the n-type region and the cathode) of the photoelectric conversion device 101 is electrically connected to the conductive layer 685. The layer 565b (corresponding to the p-type region and the anode) is electrically connected to the conductive layer 686. The conductive layers 685 and 686 each include a region embedded in the insulating layer 661. Furthermore, the surfaces of the insulating layer 661 and the conductive layers 685 and 686 are planarized to be level with each other.

In the layer 563a, the insulating layer 638 is formed over the insulating layer 637. In addition, a conductive layer 683 electrically connected to one of the source and the drain of the transistor 102 and a conductive layer 684 electrically connected to the conductive layer 636 are formed.

The insulating layer 638 and the conductive layers 683 and 684 function as bonding layers. The conductive layers 683 and 684 each include a region embedded in the insulating layer 638. Furthermore, the surfaces of the insulating layer 638 and the conductive layers 683 and 684 are planarized to be level with each other.

Here, the conductive layers 683, 684, 685, and 686 are the same bonding layers as the above-described conductive layers 619 and 639. The insulating layers 638 and 661 are the same bonding layers as the above-described insulating layers 618 and 631.

Thus, when the conductive layer 683 and the conductive layer 685 are bonded to each other, the layer 565a (corresponding to the n-type region and the cathode) of the photoelectric conversion device 101 can be electrically connected to the one of the source and the drain of the transistor 102. In addition, when the conductive layer 684 and the conductive layer 686 are bonded to each other, the layer 565b (corresponding to the p-type region and the anode) of the photoelectric conversion device 101 can be electrically connected to the wiring 114 (see FIG. 3). When the insulating layer 638 and the insulating layer 661 are bonded to each other, electrical bonding and mechanical bonding of the layer 561 and the layer 563a can be performed.

Figure 15:
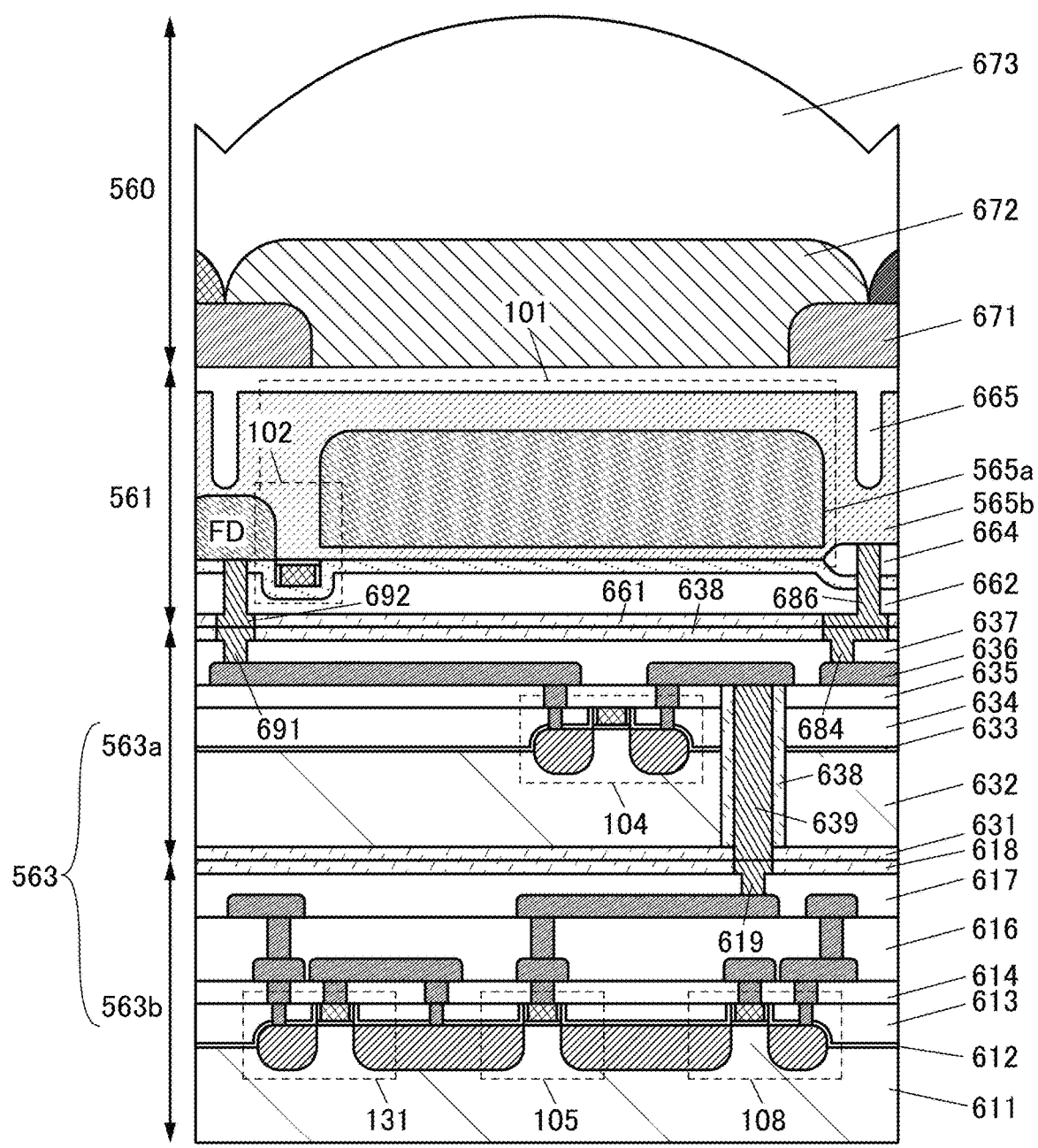
FIG. 15 is a cross-sectional view illustrating a pixel.

FIG. 15 illustrates a modification example having a difference from the above, in which the transistor 102 is provided in the layer 561. In this structure, the one of the source and the drain of the transistor 102 is directly connected to the photoelectric conversion device 101 and the other of the source and the drain thereof functions as the node FD. This structure enables complete transfer of electric charges accumulated in the photoelectric conversion device 101, leading to an imaging device with little noise.

Here, the other of the source and the drain of the transistor 102 included in the layer 561 is electrically connected to a conductive layer 692. One of a source and a drain of the transistor 104 included in the layer 563 is electrically connected to a conductive layer 691. The conductive layers 691 and 692 are bonding layers like the above-described conductive layers 619 and 639.

<Stacked-Layer Structure 2>

Figure 16:
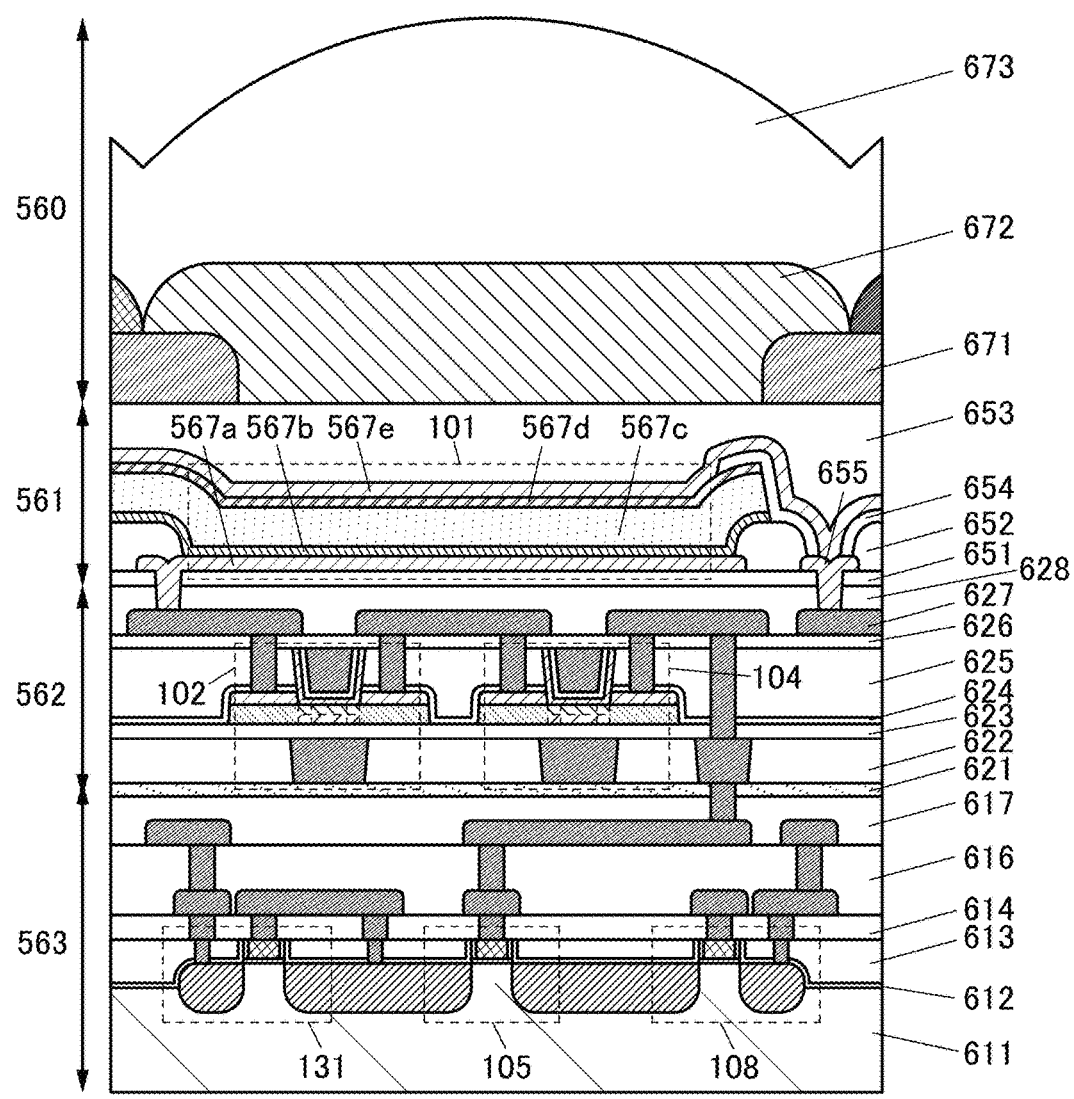
FIG. 16 is a cross-sectional view illustrating a pixel.

FIG. 16 is an example of a cross-sectional view of a stack including the layers 560, 561, 562, and 563 and not including a bonding surface. Si transistors are provided in the layer 563. OS transistors are provided in the layer 562. Note that the structures of the layer 563, the layer 561, and the layer 560 are not described here because they are the same as the structures illustrated in FIG. 12.

<Layer 562>

The layer 562 is formed over the layer 563. The layer 562 includes OS transistors. Here, the transistor 102 and the transistor 104 are illustrated. In the cross-sectional view illustrated in FIG. 16, electrical connection between the transistors is not illustrated.

Insulating layers 621, 622, 623, 624, 625, 626, and 628 are provided in the layer 562. Moreover, a conductive layer 627 is provided. The conductive layer 627 can be electrically connected to the wiring 114 (see FIG. 3).

The insulating layer 621 functions as a blocking layer. The insulating layers 622, 623, 625, 626, and 628 function as interlayer insulating films and planarization films. The insulating layer 624 has a function of a protective film.

As the blocking layer, a film that has a function of preventing hydrogen diffusion is preferably used. In a Si device, hydrogen is necessary to terminate dangling bonds; however, hydrogen in the vicinity of an OS transistor is one factor of generating carriers in an oxide semiconductor layer, which leads to a decrease in reliability. Therefore, a hydrogen blocking film is preferably provided between a layer in which the Si device is formed and a layer in which the OS transistor is formed.

For the blocking film, for example, aluminum oxide, aluminum oxynitride, gallium oxide, gallium oxynitride, yttrium oxide, yttrium oxynitride, hafnium oxide, hafnium oxynitride, or yttria-stabilized zirconia (YSZ) can be used.

The other of the source and the drain of the transistor 104 is electrically connected to the gate of the transistor 105 through a plug. Furthermore, the conductive layer 627 is electrically connected to the wiring 114 (see FIG. 3A).

The one of the source and the drain of the transistor 102 is electrically connected to the cathode of the photoelectric conversion device 101 included in the layer 561. The conductive layer 627 is electrically connected to the anode of the photoelectric conversion device 101 included in the layer 561.

Figure 17A:
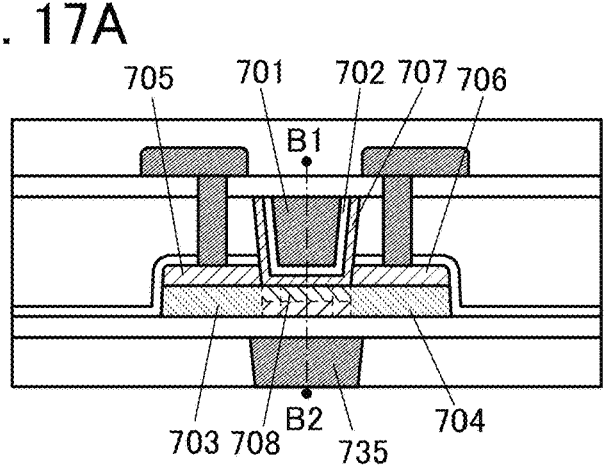
FIG. 17A to FIG. 17D are diagrams illustrating OS transistors.

The details of an OS transistor are illustrated in FIG. 17A. The OS transistor illustrated in FIG. 17A has a self-aligned structure in which a source electrode 705 and a drain electrode 706 are formed through provision of an insulating layer over stacked layers of an oxide semiconductor layer and a conductive layer and provision of opening portions reaching the oxide semiconductor layer.

The OS transistor can include a gate electrode 701 and a gate insulating film 702 in addition to a channel formation region 708, a source region 703, and a drain region 704, which are formed in the oxide semiconductor layer. At least the gate insulating film 702 and the gate electrode 701 are provided in the opening portion. The opening portion may further be provided with an oxide semiconductor layer 707.

Figure 17B:
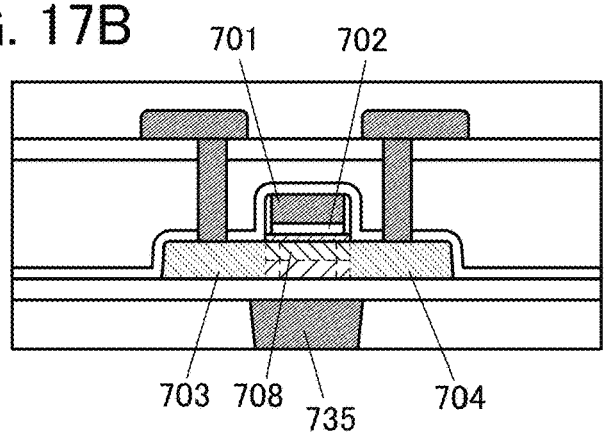

As illustrated in FIG. 17B, the OS transistor may have a self-aligned structure in which the source region 703 and the drain region 704 are formed in the semiconductor layer with the gate electrode 701 as a mask.

Figure 17C:
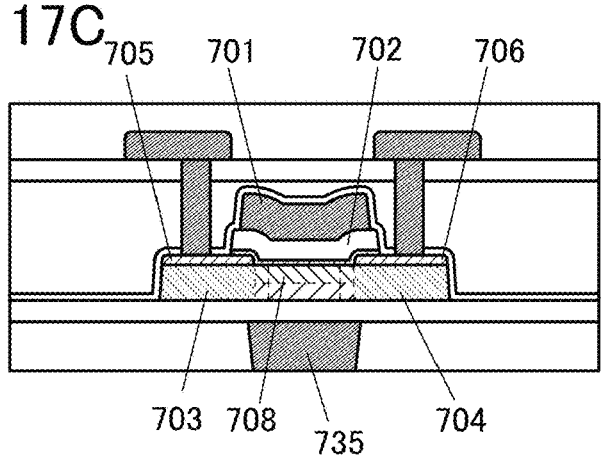

As illustrated in FIG. 17C, the OS transistor may be a non-self-aligned top-gate transistor including a region where the source electrode 705 or the drain electrode 706 overlaps with the gate electrode 701.

Figure 17D:
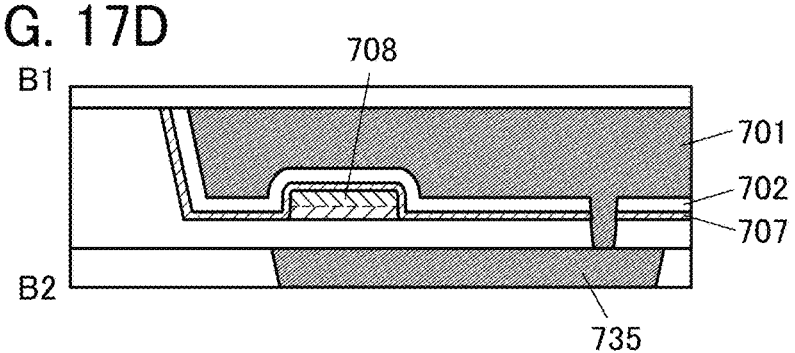

Although the OS transistor has a structure with a back gate 735, it may have a structure without a back gate. As illustrated in a cross-sectional view of the transistor in the channel width direction in FIG. 17D, the back gate 735 may be electrically connected to a front gate of the transistor, which is provided to face the back gate. Note that FIG. 17D illustrates an example of a B1-B2 cross section of the transistor in FIG. 17A, and the same applies to a transistor having any of the other structures. A structure where a fixed potential different from the potential supplied to the front gate is supplied to the back gate 735 may be employed.

Modification Example of Stacked-Layer Structure 2

Figure 18:
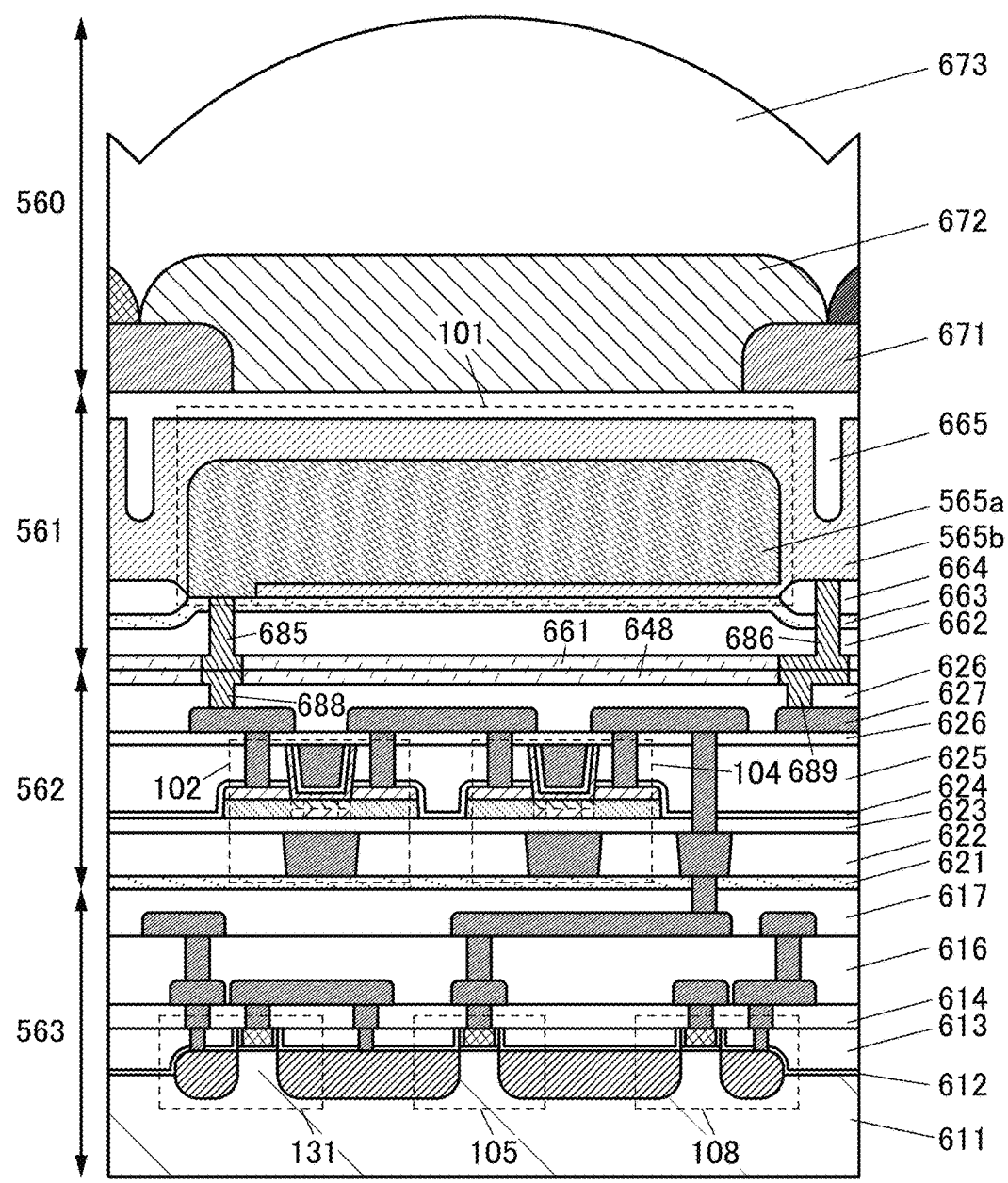
FIG. 18 is a cross-sectional view illustrating a pixel.

FIG. 18 is a modification example of the stacked-layer structure illustrated in FIG. 17 and differs from FIG. 17 in the structure of the photoelectric conversion device 101 included in the layer 561 and part of the structure of the layer 562; a bonding surface is included between the layer 561 and the layer 562.

The photoelectric conversion device 101 included in the layer 561 is a pn junction photodiode and has a structure similar to that illustrated in FIG. 14.

In the layer 562, an insulating layer 648 is formed over the insulating layer 628. In addition, a conductive layer 688 electrically connected to the one of the source and the drain of the transistor 102 and a conductive layer 689 electrically connected to the conductive layer 627 are formed.

The insulating layer 648 and the conductive layers 688 and 689 function as bonding layers. The conductive layers 688 and 689 each include a region embedded in the insulating layer 648. Furthermore, the surfaces of the insulating layer 648 and the conductive layers 683 and 684 are planarized to be level with each other.

Here, the conductive layers 688 and 689 are the same bonding layers as the above-described conductive layers 619 and 639. The insulating layer 648 is the same bonding layer as the above-described insulating layers 618 and 631.

Thus, when the conductive layer 688 and the conductive layer 685 are bonded to each other, the layer 565a (corresponding to the n-type region and the cathode) of the photoelectric conversion device can be electrically connected to the one of the source and the drain of the transistor 102. In addition, when the conductive layer 689 and the conductive layer 686 are bonded to each other, the layer 565b (corresponding to the p-type region and the anode) of the photoelectric conversion device can be electrically connected to the wiring 114 (see FIG. 3). When the insulating layer 648 and the insulating layer 661 are bonded to each other, electrical bonding and mechanical bonding of the layer 561 and the layer 562a can be performed.

In the case where a plurality of Si devices are stacked, a polishing step and a bonding step are required to be performed a plurality of times. Consequently, there are issues such as a large number of manufacturing steps, the need for a dedicated apparatus, and a low yield, and the manufacturing cost is high. An OS transistor can be formed to be stacked over a semiconductor substrate on which a device is formed, and thus a bonding step can be skipped.

Note that the structure illustrated in FIG. 15 in which the transistor 102 is provided in the layer 561 may be applied to this structure.

<Package, Module>

FIG. 20A1 is an external perspective view of the top surface side of a package in which an image sensor chip is placed. The package includes a package substrate 410 to which an image sensor chip 450 (see FIG. 20A3) is fixed, a cover glass 420, an adhesive 430 for bonding them, and the like.

FIG. 20A2 is an external perspective view of the bottom surface side of the package. A BGA (Ball grid array) in which solder balls are used as bumps 440 on the bottom surface of the package is employed. Note that, other than the BGA, an LGA (Land grid array), a PGA (Pin Grid Array), or the like may be employed.

FIG. 20A3 is a perspective view of the package, in which parts of the cover glass 420 and the adhesive 430 are not illustrated. Electrode pads 460 are formed over the package substrate 410, and the electrode pads 460 and the bumps 440 are electrically connected to each other via through-holes. The electrode pads 460 are electrically connected to the image sensor chip 450 through wires 470.

FIG. 20B1 is an external perspective view of the top surface side of a camera module in which an image sensor chip is placed in a package with a built-in lens. The camera module includes a package substrate 411 to which an image sensor chip 451 (FIG. 20B3) is fixed, a lens cover 421, a lens 435, and the like. Furthermore, an IC chip 490 (FIG. 20B3) having functions of a driver circuit, a signal conversion circuit, and the like of an imaging device is provided between the package substrate 411 and the image sensor chip 451; thus, the structure as an SiP (System in package) is included.

FIG. 20B2 is an external perspective view of the bottom surface side of the camera module. A QFN (Quad flat no-lead package) structure in which lands 441 for mounting are provided on the bottom surface and side surfaces of the package substrate 411 is employed. Note that this structure is only an example, and a QFP (Quad flat package) or the above-mentioned BGA may also be provided.

FIG. 20B3 is a perspective view of the module, in which parts of the lens cover 421 and the lens 435 are not illustrated. The lands 441 are electrically connected to electrode pads 461, and the electrode pads 461 are electrically connected to the image sensor chip 451 or the IC chip 490 through wires 471.

The image sensor chip placed in a package having the above-described form can be easily mounted on a printed substrate or the like, and the image sensor chip can be incorporated in a variety of semiconductor devices and electronic devices.

This embodiment can be combined with the other embodiments as appropriate.

Embodiment 3

As electronic devices that can use the imaging device of one embodiment of the present invention, display devices, personal computers, image memory devices or image reproducing devices provided with storage media, mobile phones, game machines including portable game machines, portable data terminals, e-book readers, cameras such as video cameras and digital still cameras, goggle-type displays (head mounted displays), navigation systems, audio reproducing devices (car audio players, digital audio players, and the like), copiers, facsimiles, printers, multifunction printers, automated teller machines (ATM), vending machines, and the like are given. FIG. 21A to FIG. 21F illustrate specific examples of these electronic devices.

Figure 21A:
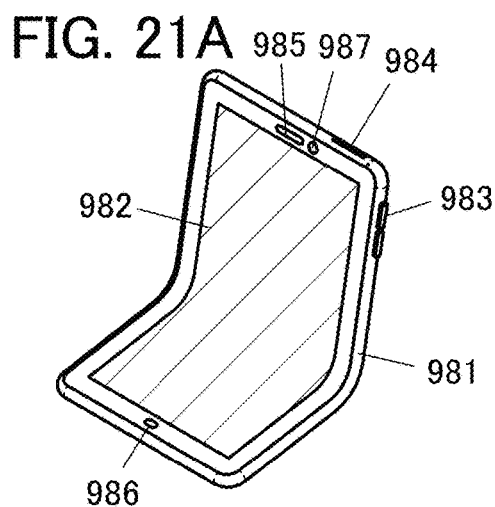
FIG. 21A to FIG. 21F are diagrams illustrating electronic devices.

FIG. 21A is an example of a portable information terminal mobile phone, which includes a housing 981, a display portion 982, an operation button 983, an external connection port 984, a speaker 985, a microphone 986, a camera 987, and the like. The display portion 982 of the portable information terminal is provided with a touch sensor. A variety of operations such as making a call and inputting text can be performed by touch on the display portion 982 with a finger, a stylus, or the like. The imaging device of one embodiment of the present invention and the operation method thereof can be used in the portable information terminal.

The camera 987 includes the imaging device of one embodiment of the present invention, and can obtain distance data of an object in an image obtained with the camera 987. Part of the image obtained with the camera 987 can be processed on the basis of the distance data. For example, image processing of blurring the vicinity of a main object can be performed.

Figure 21B:
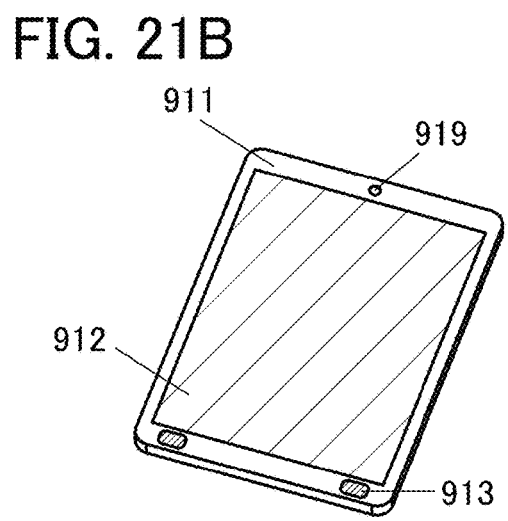

FIG. 21B is an information terminal, which includes a housing 911, a display portion 912, a speaker 913, a camera 919, and the like. A touch panel function of the display portion 912 enables input and output of information. Furthermore, a character or the like in an image that is captured by the camera 919 can be recognized and the character can be voice-output from the speaker 913. The imaging device of one embodiment of the present invention and the operation method thereof can be used in the portable data terminal.

Figure 21C:
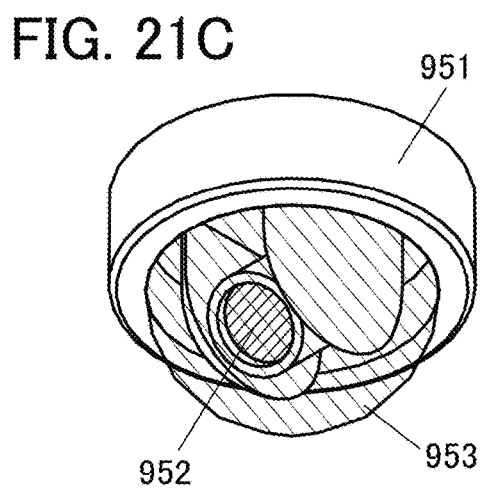

FIG. 21C is a surveillance camera, which includes a support base 951, a camera unit 952, a protection cover 953, and the like. By setting the camera unit 952 provided with a rotating mechanism and the like on a ceiling, an image of all of the surroundings can be taken. The imaging device of one embodiment of the present invention and the operation method thereof can be used for obtaining an image in the camera unit. Note that a surveillance camera is a name in common use and does not limit the use thereof. A device that has a function of a surveillance camera can also be called a camera or a video camera, for example.

Figure 21D:
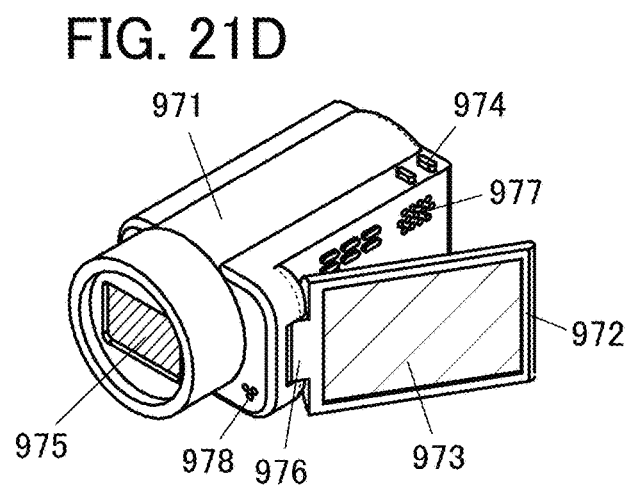

FIG. 21D is a video camera, which includes a first housing 971, a second housing 972, a display portion 973, an operation key 974, a lens 975, a connection portion 976, a speaker 977, a microphone 978, and the like. The operation key 974 and the lens 975 are provided for the first housing 971, and the display portion 973 is provided for the second housing 972. The imaging device of one embodiment of the present invention and the operation method thereof can be used in the video camera.

Figure 21E:
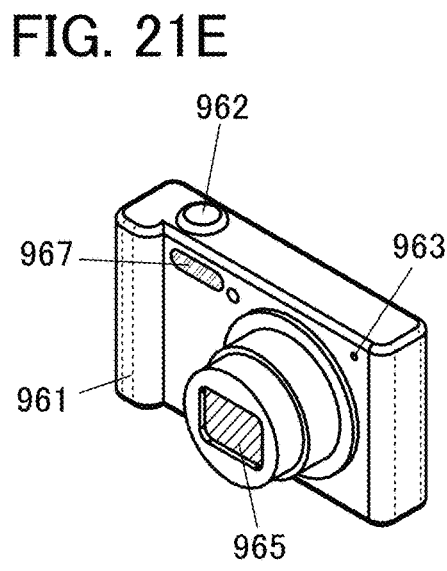

FIG. 21E is a digital camera, which includes a housing 961, a shutter button 962, a microphone 963, a light-emitting portion 967, a lens 965, and the like. The imaging device of one embodiment of the present invention and the operation method thereof can be used in the digital camera.

Figure 21F:
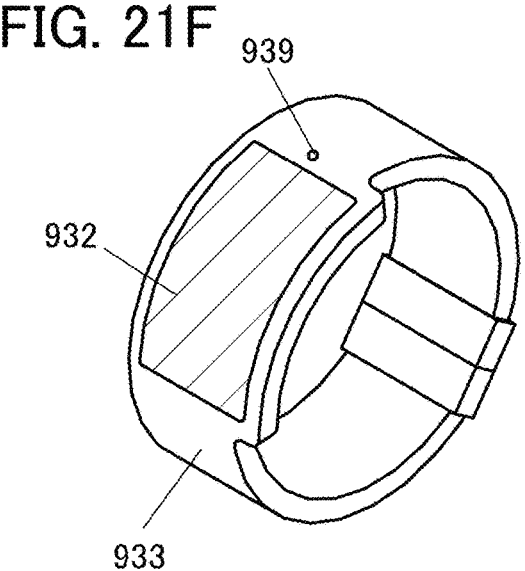

FIG. 21F is a wrist-watch-type information terminal, which includes a display portion 932, a housing and wristband 933, a camera 939, and the like. The display portion 932 is provided with a touch panel for performing the operation of the information terminal. The display portion 932 and the housing and wristband 933 have flexibility and fit a body well. The imaging device of one embodiment of the present invention and the operation method thereof can be used in the information terminal.

Figure 22:
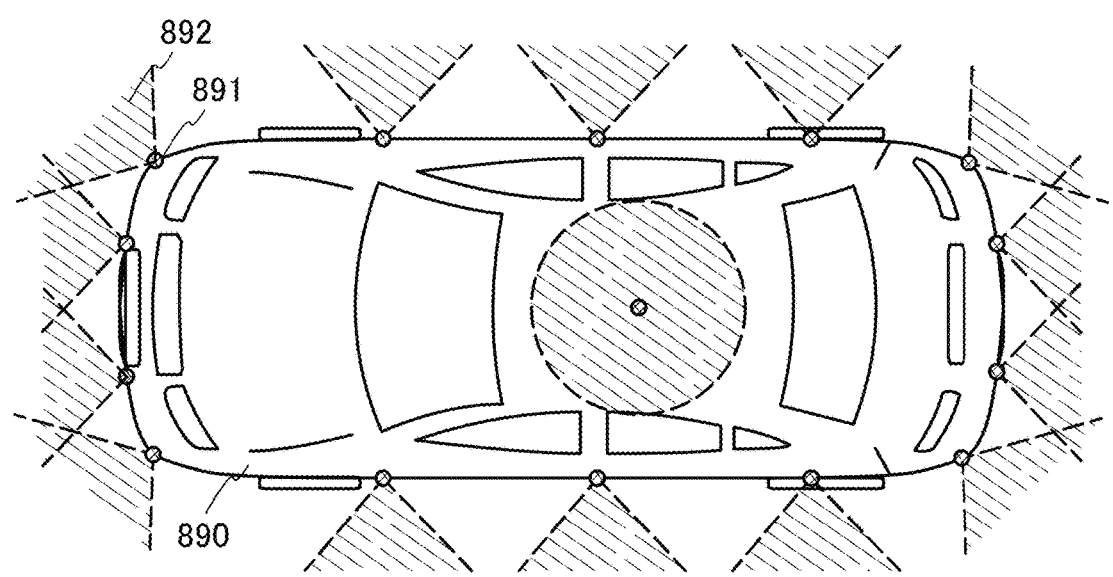
FIG. 22 is a diagram illustrating an automobile.

FIG. 22A illustrates an external view of an automobile as an example of a moving object. An automobile 890 includes a plurality of cameras 891 and the like, and can obtain data on the front, the rear, the left, the right, and the upper part of the automobile 890. The imaging device of one embodiment of the present invention and the operation method thereof can be used in the cameras 891. The automobile 890 is also provided with various sensors such as an infrared radar, a millimeter wave radar, and a laser radar (not illustrated) and the like. The automobile 890 judges traffic conditions therearound such as the presence of a guardrail or a pedestrian by analyzing images in a plurality of image capturing directions 892 taken by the cameras 891, and thus can perform autonomous driving. The cameras 891 can be used in a system for navigation, risk prediction, or the like.

When arithmetic processing with a neural network or the like is performed on the obtained image data in the imaging device of one embodiment of the present invention, for example, processing such as an increase in image resolution, a reduction in image noise, face recognition (for security reasons or the like), object recognition (for autonomous driving or the like), image compression, image compensation (a wide dynamic range), restoration of an image of a lensless image sensor, positioning, character recognition, and reduction of glare and reflection can be performed.

Note that an automobile is described above as an example of a moving object and may be any of an automobile having an internal-combustion engine, an electric vehicle, a hydrogen vehicle, and the like. Furthermore, the moving object is not limited to an automobile. Examples of moving objects include a train, a monorail train, a ship, and a flying object (a helicopter, an unmanned aircraft (a drone), an airplane, and a rocket), and these moving objects can include a system utilizing artificial intelligence when equipped with the computer of one embodiment of the present invention.

This embodiment can be combined with the other embodiments as appropriate.

REFERENCE NUMERALS

10a: circuit, 10b: circuit, 20: circuit, 30: circuit, 100: pixel, 101: photoelectric conversion device, 101a: photoelectric conversion device, 101b: photoelectric conversion device, 102: transistor, 102a: transistor, 102b: transistor, 103: transistor, 103a: transistor, 103b: transistor, 104: transistor, 104a: transistor, 104b: transistor, 105: transistor, 105a: transistor, 105b: transistor, 106: capacitor, 106a: capacitor, 106b: capacitor, 107: transistor, 108: transistor, 114: wiring, 115: wiring, 116: wiring, 117: wiring, 118: wiring, 121: wiring, 122: wiring, 123: wiring, 124: wiring, 125: wiring, 126: wiring, 127: wiring, 128: wiring, 131: transistor, 131a: transistor, 131b: transistor, 132: transistor, 133: transistor, 134: transistor, 135: capacitor, 142: transistor, 143: transistor, 144: transistor, 145: capacitor, 151: wiring, 152: wiring, 161: transistor, 162: transistor, 163: capacitor, 175: transistor, 175a: transistor, 175b: transistor, 176: transistor, 176a: transistor, 176b: transistor, 200: pixel block, 202: capacitor, 203: transistor, 204: transistor, 205: transistor, 206: transistor, 207: transistor, 210: pixel array, 212: wiring, 213: wiring, 214: wiring, 215: wiring, 216: wiring, 218: wiring, 219: wiring, 220: circuit, 222: transistor, 223: transistor, 224: transistor, 225: current supply portion, 226: current mirror portion, 230: circuit, 240: circuit, 252: transistor, 253: transistor, 254: transistor, 261: transistor, 262: transistor, 300: pixel array, 301: circuit, 302: circuit, 303: circuit, 304: circuit, 305: circuit, 311: wiring, 320: memory cell, 325: reference memory cell, 330: circuit, 350: circuit, 360: circuit, 370: circuit, 410: package substrate, 411: package substrate, 420: cover glass, 421: lens cover, 430: adhesive, 435: lens, 440: bump, 441: land, 450: image sensor chip, 451: image sensor chip, 460: electrode pad, 461: electrode pad, 470: wire, 471: wire, 490: IC chip, 545: semiconductor layer, 546: insulating layer, 560: layer, 561: layer, 562:

layer, 562*a*: layer, 563: layer, 563*a*: layer, 563*b*: layer, 563*c*: layer, 565*a*: layer, 565*b*: layer, 566*a*: layer, 566*b*: layer, 566*c*: layer, 566*d*: layer, 567*a*: layer, 567*b*: layer, 567*c*: layer, 567*d*: layer, 567*c*: layer, 611: silicon substrate, 612: insulating layer, 613: insulating layer, 614: insulating layer, 616: insulating layer, 617: insulating layer, 618: insulating layer, 619: conductive layer, 621: insulating layer, 622: insulating layer, 623: insulating layer, 624: insulating layer, 625: insulating layer, 626: insulating layer, 627: conductive layer, 628: insulating layer, 631: insulating layer, 632: silicon substrate, 633: insulating layer, 634: insulating layer, 635: insulating layer, 636: conductive layer, 637: insulating layer, 638: insulating layer, 639: conductive layer, 648: insulating layer, 651: insulating layer, 652: insulating layer, 653: insulating layer, 654: insulating layer, 655: conductive layer, 661: insulating layer, 662: insulating layer, 664: insulating layer, 665: insulating layer, 671: light-blocking layer, 672: optical conversion layer, 672B: color filter, 672G: color filter, 672IR: infrared filter, 672R: color filter, 672UV: ultraviolet filter, 673: micro lens array, 683: conductive layer, 684: conductive layer, 685: conductive layer, 686: conductive layer, 688: conductive layer, 689: conductive layer, 691: conductive layer, 692: conductive layer, 701: gate electrode, 702: gate insulating film, 703: source region, 704: drain region, 705: source electrode, 706: drain electrode, 707: oxide semiconductor layer, 708: channel formation region, 735: back gate, 890: automobile, 891: camera, 892: image capturing direction, 911: housing, 912: display portion, 913: speaker, 919: camera, 932: display portion, 933: housing and wristband, 939: camera, 951: support base, 952: camera unit, 953: protection cover, 961: housing, 962: shutter button, 963: microphone, 965: lens, 967: light-emitting portion, 971: housing, 972: housing, 973: display portion, 974: operation key, 975: lens, 976: connection portion, 977: speaker, 978: microphone, 981: housing, 982: display portion, 983: operation button, 984: external connection port, 985: speaker, 986: microphone, 987: camera

The invention claimed is:

1. An imaging device comprising a pixel,
   wherein the pixel comprises a first light-receiving circuit, a second light-receiving circuit, a differential amplifier circuit, and an arithmetic circuit,
   wherein the differential amplifier circuit comprises a first transistor, a second transistor, a third transistor, a fourth transistor, and a fifth transistor,
   wherein the arithmetic circuit comprises a sixth transistor, a seventh transistor, an eighth transistor, a ninth transistor, a tenth transistor, an eleventh transistor, a first capacitor, and a second capacitor,
   wherein first data output from the first light-receiving circuit is input to a gate of the first transistor,
   wherein second data output from the second light-receiving circuit is input to a gate of the second transistor,
   wherein one of a source and a drain of the first transistor is electrically connected to one of a source and a drain of the fifth transistor,
   wherein one of a source and a drain of the second transistor is electrically connected to the one of the source and the drain of the fifth transistor,
   wherein the other of the source and the drain of the first transistor is electrically connected to a gate and one of a source and a drain of the third transistor,
   wherein the other of the source and the drain of the second transistor is electrically connected to a gate and one of a source and a drain of the fourth transistor,
   wherein the gate of the fourth transistor is electrically connected to one of a source and a drain of the sixth transistor,
   wherein the other of the source and the drain of the sixth transistor is electrically connected to one electrode of the first capacitor,
   wherein the other electrode of the first capacitor is electrically connected to one of a source and a drain of the eighth transistor,
   wherein the other of the source and the drain of the eighth transistor is electrically connected to one of a source and a drain of the ninth transistor,
   wherein a gate of the eighth transistor is electrically connected to a gate of the ninth transistor,
   wherein the other of the source and the drain of the ninth transistor is electrically connected to one electrode of the second capacitor,
   wherein the other electrode of the second capacitor is electrically connected to one of a source and a drain of the tenth transistor and a gate of the eleventh transistor, and
   wherein the other of the source and the drain of the tenth transistor is electrically connected to the gate of the fourth transistor.

2. An electronic device comprising the imaging device according to claim 1, wherein on the basis of an image taken with the imaging device and distance data of an object in the image analyzed with the imaging device, the electronic device processes part of the image.

* * * * *